(12) United States Patent
Aoki

(10) Patent No.: US 8,385,608 B2
(45) Date of Patent: Feb. 26, 2013

(54) DICTIONARY DATA REGISTRATION APPARATUS AND DICTIONARY DATA REGISTRATION METHOD

(75) Inventor: Yasuhiro Aoki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 676 days.

(21) Appl. No.: 12/568,341

(22) Filed: Sep. 28, 2009

(65) Prior Publication Data

US 2010/0067751 A1 Mar. 18, 2010

Related U.S. Application Data

(63) Continuation of application No. PCT/JP2008/054996, filed on Mar. 18, 2008.

(30) Foreign Application Priority Data

Mar. 29, 2007 (JP) ................................. 2007-086132

(51) Int. Cl.
*G06K 9/00* (2006.01)
(52) U.S. Cl. ....................................................... 382/118
(58) Field of Classification Search .................... None
See application file for complete search history.

(56) References Cited

U.S. PATENT DOCUMENTS

| | | | | |
|---|---|---|---|---|
| 7,986,339 B2 * | 7/2011 | Higgins | ......................... | 348/149 |
| 2005/0151842 A1 * | 7/2005 | Oohashi | ......................... | 348/86 |
| 2006/0291692 A1 | 12/2006 | Nakao et al. | | |

FOREIGN PATENT DOCUMENTS

| | | |
|---|---|---|
| JP | 2002-531901 | 9/2002 |
| JP | 2003-141541 | 5/2003 |
| JP | 2004-511870 | 4/2004 |
| JP | 2004-265231 | 9/2004 |
| JP | 2004-356730 | 12/2004 |
| JP | 2005-056004 | 3/2005 |
| JP | 2005-100369 | 4/2005 |

OTHER PUBLICATIONS

International Search Report for PCT/JP2008/054996.
Jeffrey P. Foster, et al.; "New Area Based Metrics for Automatic Gait Recognition, Proceedings of British Machine Vision Conference"; Dec. 31, 2001; pp. 233-242.
Alex Pentland, et al. View Based and Modular Eigenspaces for Face Recognition, Proceedings. CVPR'94. ; Jun. 21, 1994; pp. 84-91.

* cited by examiner

*Primary Examiner* — Vikkram Bali
(74) *Attorney, Agent, or Firm* — Pillsbury Winthrop Shaw Pittman, LLP

(57) ABSTRACT

A face data registration apparatus is an apparatus to register dictionary data for walker authentication by use of a face image. The face data registration apparatus causes a posture data collection unit to collect posture variation data from a plurality of face images obtained by photographing a face of a registrant whose posture (face direction) is changed, further causes a walking data collection unit to collect walking data from a face image obtained by photographing a face of the registrant who actually walks along a passage, causes a synthesizing unit to create dictionary data by synthesizing posture variation data and walking data and registers the created dictionary data as dictionary data used to authenticate a person who walks in the passage by face collation into a dictionary data unit.

10 Claims, 13 Drawing Sheets

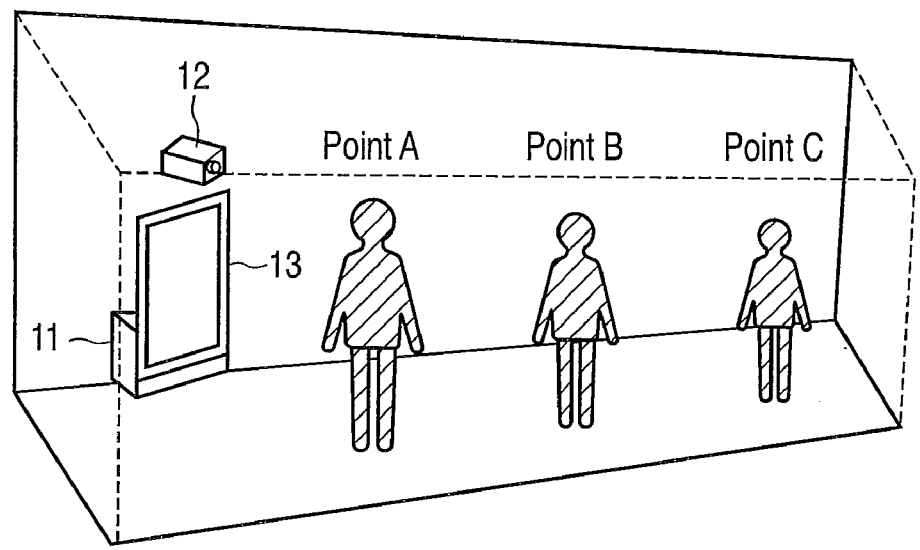
F I G. 1
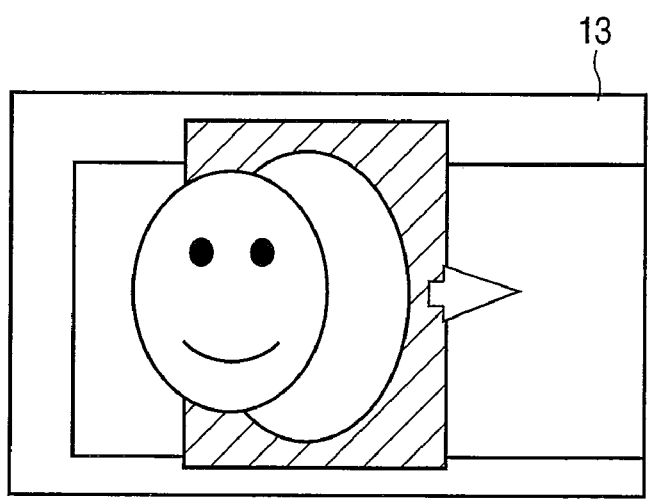
F I G. 2

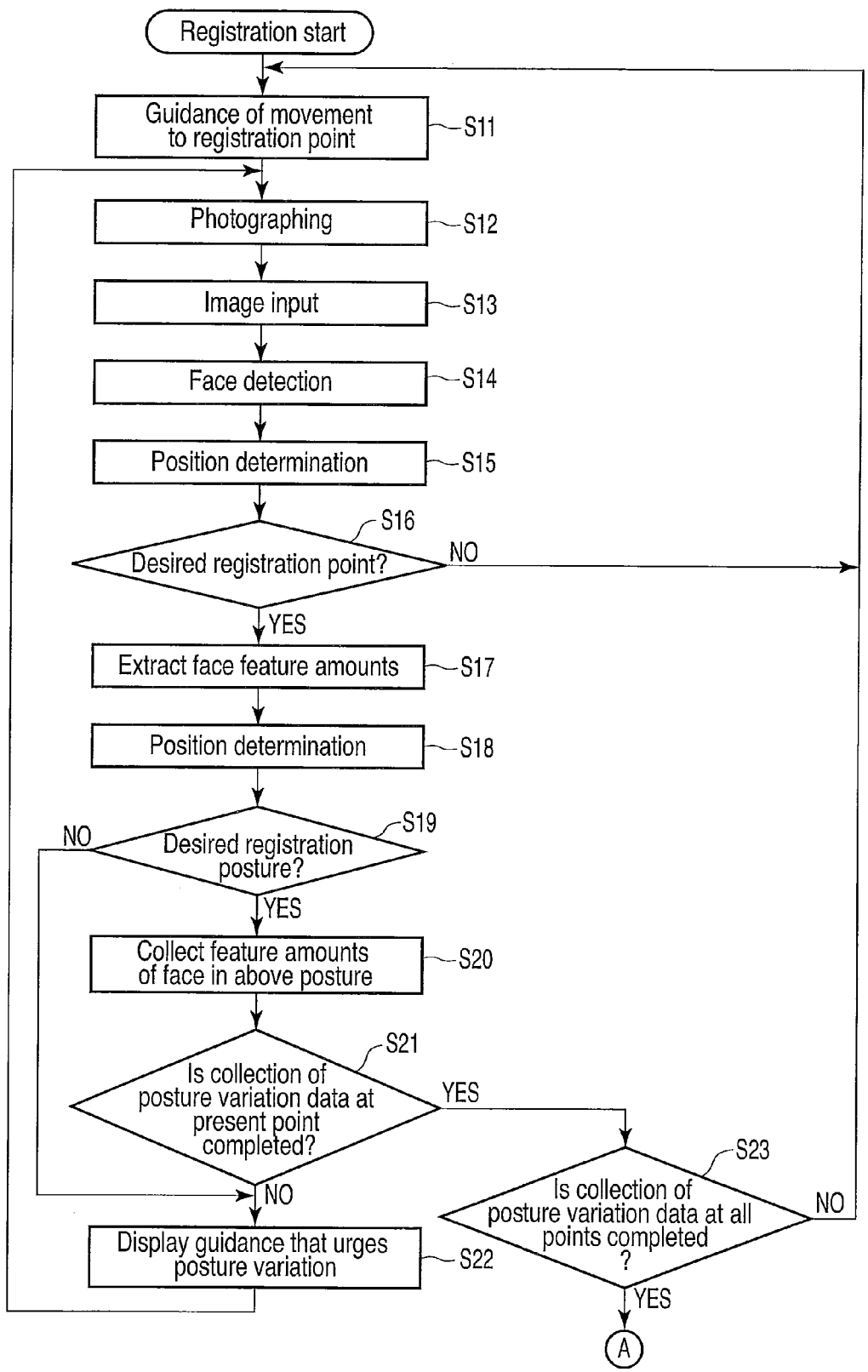
F I G. 7

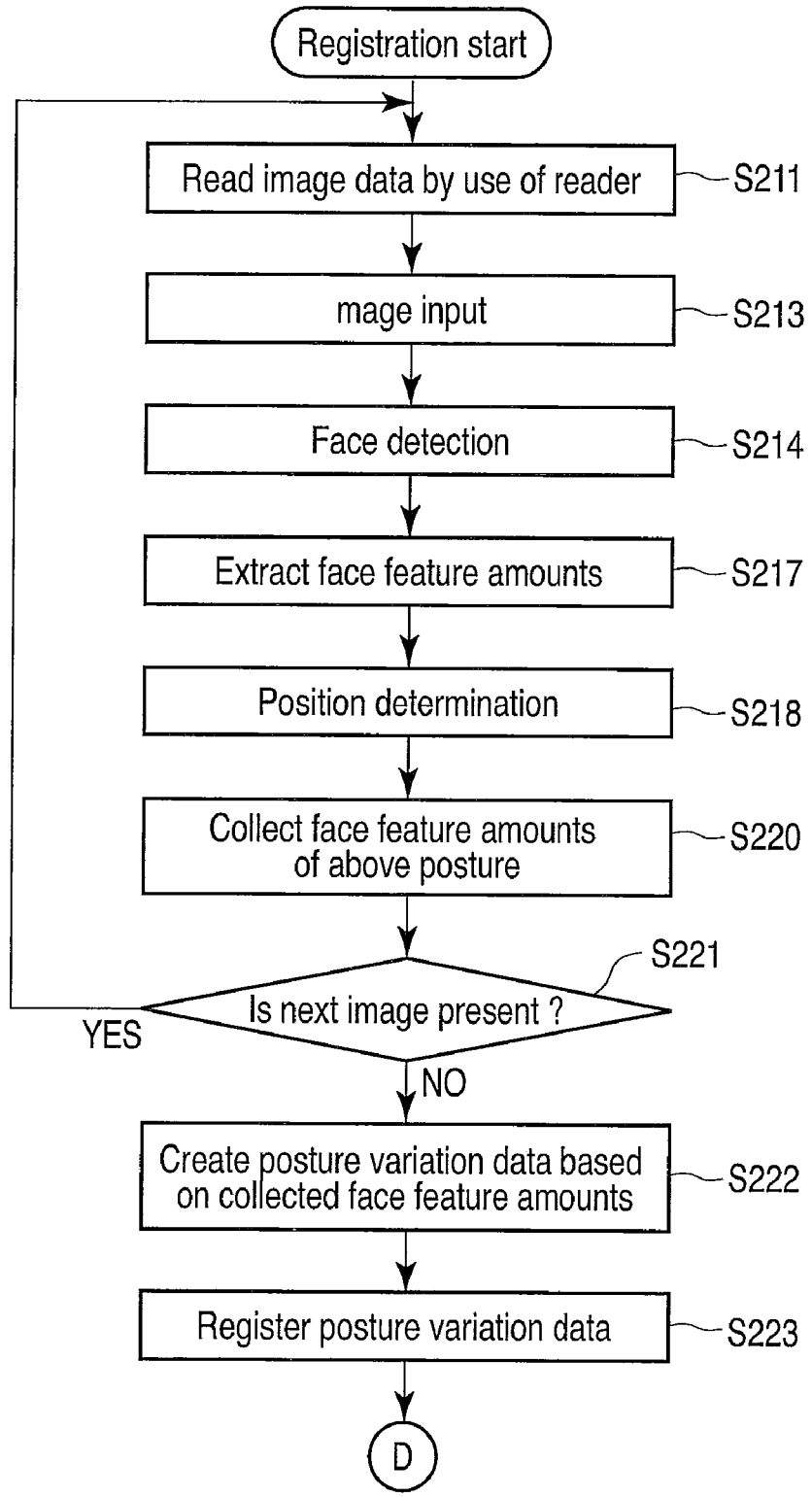
F I G. 17

US 8,385,608 B2

DICTIONARY DATA REGISTRATION APPARATUS AND DICTIONARY DATA REGISTRATION METHOD

CROSS REFERENCE TO RELATED APPLICATIONS

This is a Continuation Application of PCT Application No. PCT/JP2008/054996, filed Mar. 18, 2008, which was published under PCT Article 21(2) in Japanese.

This application is based upon and claims the benefit of priority from prior Japanese Patent Application No. 2007-086132, filed Mar. 29, 2007, the entire contents of which are incorporated herein by reference.

BACKGROUND OF THE INVENTION

1. Field of the Invention

This invention relates to a dictionary data registration apparatus and dictionary data registration method used in a walker authentication apparatus that authenticates a walker by, for example, photographing a face image of a to-be-authenticated person who is walking and collating face data of the to-be-authenticated person (walker) photographed with face data previously registered as dictionary data.

2. Description of the Related Art

In most of the conventional general face authentication apparatuses, an authentication process for a to-be-authenticated person is performed by photographing the face image of the to-be-authenticated person who stands still and collating the photographed face image with previously registered face images. On the other hand, recently, a walker authentication apparatus that authenticates a walker by photographing a face image of the walker and collating face data of the photographed walker with face data previously registered as dictionary data is developed. In the above walker authentication apparatus, an image containing a face of a person who is walking is photographed by a camera, a face region of the walker is extracted from the photographed image and face data (input subspace) as a feature amount of the face obtained from the image (face image) of the extracted face region is collated with face data (registered subspace) previously registered as dictionary data.

In the above walker authentication apparatus, since the face of a person who is walking is photographed, a variation in the state of the face image in the photographed image is large. For example, since a to-be-authenticated person is walking, the posture of the to-be-authenticated person (the direction of the face) varies to a larger extent in comparison with a case wherein he stands still. Further, since the camera is not used to photograph only a person in a specified position, a variation in the photographing conditions becomes large due to a variation in the environment, such as the position of the to-be-photographed person or illumination. Generally, in a face collation process, the collation precision is degraded if the posture of the face image (face direction) photographed at the time of the collation process and the posture of the face image (face direction) photographed at the registration time vary or the photographing conditions at the collation process time and at the registration time vary. Therefore, in the walker authentication apparatus, it is necessary to frequently update registration information (face image for registration) or acquire a plurality of registration information items in various conditions in order to stably attain authentication performance.

For example, in order to collect face images containing variations in postures while he is actually walking, it is considered to collect a lot of face images of a registrant while walking by causing the registrant to repeatedly walk along a passage. Further, in order to collect face images containing variations in an environment, it is necessary to require that the registrant repeatedly walk along the passage while the environment is varied. However, with the above method, it is necessary to force the registrant to repeatedly walk along the passage. Therefore, the above collection method of face images for registration imposes a heavy load on the user and is not very practical.

Further, conventionally, there is provided a method for urging the registrant to vary the posture (face direction) according to guidance and collecting and registering face images photographed in required postures as face images for registration (for example, Jpn. Pat. Appln. KOKAI Publication No. 2003-141541). In the above registration method, various face images can be collected by varying desired postures. However, since a variation in the posture while he actually walks is not reflected, there occurs a possibility that the collation precision may be lowered and a variation will occur in the collation precision.

As described above, in the conventional walker authentication apparatus, there occurs a problem that a load placed on the user will increase and a load on management will become heavier due to frequent updating of dictionary data in order to collect registration information (face images for registration) in a dictionary data registration process.

BRIEF SUMMARY OF THE INVENTION

One embodiment of this invention is designed to solve the above problem and an object thereof is to provide a dictionary data registration apparatus and dictionary data registration method capable of efficiently registering dictionary data while alleviating a load on the user.

A dictionary data registration apparatus according to one embodiment of this invention that registers dictionary data to authenticate a walker, includes an image input unit that inputs an image, a face detection unit that detects a face image of a person from an image input by the image input unit; a first data collection unit that collects a plurality of face data items obtained from a plurality of face images in a plurality of images obtained by photographing a face of a registrant in various postures and input by the image input unit; a second data collection unit that collects a plurality of face data items obtained from a plurality of face images in a plurality of images obtained by photographing a face of the registrant while walking and input by the image input unit; a synthesizing unit that synthesizes face data collected by the first data collection unit and face data collected by the second data collection unit; and a storage unit that stores data synthesized by the synthesizing unit as dictionary data of the registrant.

A dictionary data registration apparatus according to one embodiment of this invention that registers dictionary data to authenticate a walker includes an image input unit that inputs an image; a face detection unit that detects a face image of a person from an image input by the image input unit; a first data collection unit that collects a plurality of face data items obtained from a plurality of face images in a plurality of images obtained by photographing a face of a registrant in various postures and input by the image input unit; a second data collection unit that collects a plurality of face data items obtained from a plurality of face images in a plurality of images obtained by photographing a face of the registrant while an illumination condition is varied and input by the image input unit; a synthesizing unit that synthesizes face data collected by the first data collection unit and face data collected by the second data collection unit; and a storage unit that stores data synthesized by the synthesizing unit as dictionary data of the registrant.

A dictionary data registration method according to one embodiment of this invention that is a dictionary data registration method to authenticate a walker includes inputting a plurality of images obtained by photographing a face of a registrant in various postures; detecting face images of various postures from the input images; collecting a plurality of face data items obtained from the face images of various postures as posture variation data of the registrant; inputting a plurality of images obtained by photographing a face of the registrant while walking; detecting a plurality of face images containing variations while walking from the input images; collecting a plurality of face data items obtained from the face images containing variations while walking as walking data of the registrant; synthesizing the posture variation data and the walking data; and storing the synthesized data as dictionary data of the registrant into a storage unit.

A dictionary data registration method according to one embodiment of this invention that is a dictionary data registration method to authenticate a walker includes inputting a plurality of images obtained by photographing a face of a registrant in various postures; detecting face images of various postures from the input images; collecting a plurality of face data items obtained from the face images of various postures as posture variation data of the registrant; inputting a plurality of images obtained by photographing a face of the registrant while varying an illumination condition; detecting a plurality of face images containing illumination variations from the input images; collecting a plurality of face data items obtained from the face images containing the illumination variations as environment variation data of the registrant; synthesizing the posture variation data and the environment variation data; and storing the synthesized data as dictionary data of the registrant into a storage unit.

BRIEF DESCRIPTION OF THE SEVERAL VIEWS OF THE DRAWING

FIG. 1 is a view for illustrating an example of the operation form of a walker authentication system according to a first embodiment.

FIG. 2 is a view showing an example of a guidance screen displayed on a display device.

FIG. 7 is a flowchart for illustrating a posture variation data collection process in a dictionary data registration process as the first embodiment.

FIG. 17 is a flowchart for illustrating a posture variation data collection process in a dictionary data registration process as the third embodiment.

DETAILED DESCRIPTION OF THE INVENTION

Figure 3:
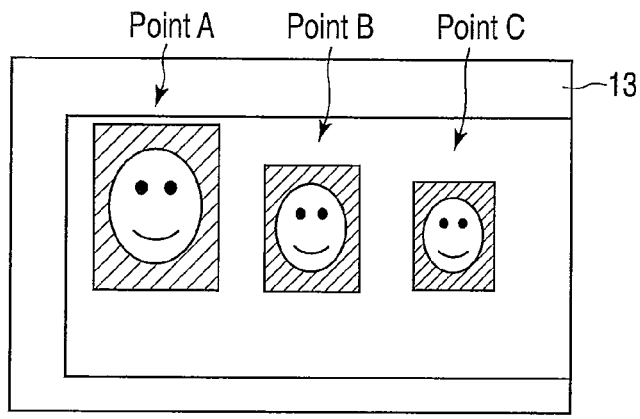
FIG. 3 is a view showing an example of the sizes of face images when a person is photographed at points A, B, C.

There will now be described embodiments of this invention in detail with reference to the drawings.

First, a first embodiment is explained.

FIG. 1 is a view for illustrating an example of the operation form of a walker authentication system 1 according to the first embodiment.

The walker authentication system 1 shown in FIG. 1 is a system that authenticates a person who walks along a passage having a point A, point B, point C by use of face images. In an example shown in FIG. 1, the walker authentication system 1 is configured by a walker authentication apparatus 11, camera 12, display device 13 and the like.

The camera 12 is set on the passage along which a to-be-recognized person (walker) passes. The camera 12 is disposed to permit a face image (an image containing a face) of a walker who moves (walks) in a present direction to be photographed in the passage. The camera 12 is used to photograph a portion in the passage as a moving image or still images at preset intervals. An image photographed by the camera 12 is supplied to the walker authentication apparatus 11. Further, the camera 12 may be set as a monitor camera that monitors the state of a portion of the passage. In addition, the camera 12 may be a plurality of cameras set in respective portions in the passage.

The display device 13 is configured by an LCD panel and the like. The display device 13 is disposed in a position in which a person in the passage can observe it. On the display device 13, guidance or the like for the person in the passage is displayed. On the display device 13, guidance or the like to the effect that a specified movement is required for a person in the passage is displayed or passage guidance is displayed for the person who walks in a preset direction in the passage.

The content displayed on the display device 13 is controlled by the walker authentication apparatus 11. For example, FIG. 2 is a view showing an example of a guidance screen displayed on the display device 13. In the example shown in FIG. 2, a face image of the user and a graphical image (arrow) indicating the moving direction are displayed in order to urge him to move his face position.

The walker authentication apparatus 11 is an apparatus that authenticates whether or not a walker who walks in a preset direction along the passage is a specified person (registrant)

previously registered. In the walker authentication apparatus 11, the walker is authenticated by collating the face image of the walker with the face image of the registrant as an authentication process. Further, in the walker authentication apparatus 11, a process of registering the face image of the registrant is performed as a registration process.

Further, the passage in which the walker authentication system is used has a point A, point B, point C. As shown in FIG. 1, it is supposed that the point A, point B, point C are set in the order of shortest distance from the camera 12. In this case, the size of the face images (face regions) which are photographed by the camera 12 becomes smaller in the order of a case of photographing the person at the point A, a case of photographing the person at the point B and a case of photographing the person at the point C.

For example, FIG. 3 is a view showing an example of the sizes of face images when the person is photographed at the points A, B, C. As shown in FIG. 3, the sizes of the face images become smaller in the order of the face image when the camera 12 photographs the person at the point A, the face image when it photographs the person at the point B and the face image when it photographs the person at the point C. Thus, when the camera 12 is fixedly set at a specified point (fixed position) (for example, when an existing monitor camera is used as the camera 12), the size of a face image detected from an image photographed by the camera 12 varies according to the position of the person who is present in the passage. If the size of the face image thus greatly varies, the authentication precision is influenced. Therefore, in this walker authentication system, face data to be registered as dictionary data is collected from images obtained by photographing a person at respective points.

Next, the configuration of the walker authentication apparatus 11 is explained.

Figure 4:
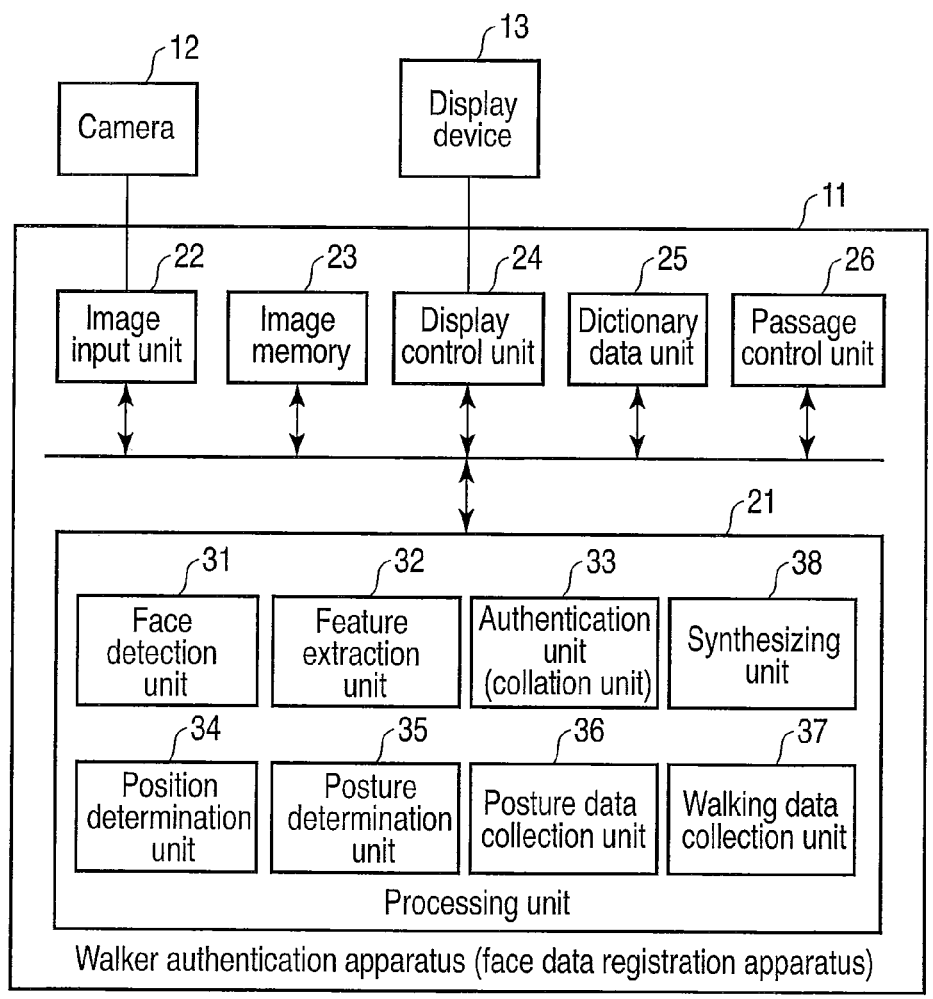
FIG. 4 is a block diagram showing an example of the configuration of the walker authentication system according to the first embodiment.

FIG. 4 is a block diagram showing an example of the configuration of the walker authentication apparatus 11.

As shown in FIG. 4, the walker authentication apparatus 11 is configured by a processing unit 21, image input unit 22, image memory 23, display control unit 24, dictionary data unit 25, passage control unit 26 and the like.

The processing unit 21 performs overall control of the walker authentication apparatus 11 and various information processes. The processing unit 21 is configured by a CPU, working memory, program memory, various internal interfaces and the like. The processing unit 21 realizes various processes and the control operation of the respective portions by causing the CPU to execute various programs stored in the program memory by use of the working memory.

The image input unit 22 is an interface that inputs an image photographed by the camera 12. For example, the image input unit 22 stores an image fetched from the camera 12 into the image memory 23. The image memory 23 is a memory that stores an image or the like photographed by the camera 12 and input by the image input unit 23. The display control unit 24 controls the contents displayed on the display device 13.

The dictionary data unit 25 stores dictionary data such as feature amounts of face images of a registrant. The dictionary data stored in the dictionary data unit 25 is used as registration information for authentication of a walker. In the dictionary data unit 25, for example, dictionary data obtained by synthesizing posture variation data and walking data is stored. In this case, the posture variation data is data such as feature amounts of a face obtained from face images of a registrant photographed in various postures (face directions) at a plurality of points in the passage. Further, the walking data is data of posture variations or the like obtained when the registrant walks along the passage. The walking data is used as data indicating a posture variation predicted when the registrant walks along the passage. The posture variation data and walking data will be described later in detail.

Therefore, in the dictionary data unit 25, the distribution of feature amounts of a face obtained by reflecting prediction (walking data) of a posture variation when the registrant walks along the passage on feature amounts (posture variation data) of a face obtained from the face images of the registrant photographed in various postures at a plurality of points in the passage is stored as dictionary data.

The dictionary data unit 25 may be provided outside the walker authentication apparatus 11. For example, the dictionary data unit 25 may be provided in an exterior device that can communicate with the walker authentication apparatus 11 via a network interface or the like.

The passage control unit 26 controls the passage of a walker based on the authentication result by using the face image. For example, when the passage of a walker is limited by a door that is not shown in the drawing (when the passage of a person other than the registrant is inhibited), the passage control unit 26 controls the opening and closing of the door that is not shown in the drawing based on the authentication result by using the face image. When the walker authentication system is not a system that controls the passage of a walker (for example, when it is simply a system that displays the authentication result by using the face image on a display device or the like), the passage control unit 26 may be omitted.

Next, various functions provided in the processing unit 21 are explained.

In the processing unit 21, as shown in FIG. 4, as functions realized by executing various programs, functions of a face detection unit 31, feature extraction unit 32, authentication unit (collating unit) 33, position determination unit 34, posture determination unit 35, posture data collection unit 36, walking data collection unit 37, synthesizing unit (dictionary data creation unit) 38 and the like are provided.

The face detection unit 31 detects a face image from an image input by the image input unit 22. That is, the face detection unit 31 detects a position that gives the highest correlation value as a face region by deriving correlation values while a previously provided template is moved in an image with respect to the image input by the image input unit 22. Further, the face region detecting method can also be realized by a face extraction method utilizing a subspace method or eigenspace method.

The feature extraction unit 32 extracts feature amounts of a face from the image of the face region detected by the face detection unit. The feature extraction unit 32 extracts positions of face portions as feature points, such as the eyes and naris in the image of a face region detected by the face detection unit. For example, the detection method of the feature points in the face image can be realized by use of a method described in a document (Kazuhiro Fukui, Osamu Yamaguchi; "Face Feature Point Extraction by Combination of Shape Extraction and Pattern Collation", Institution Papers of Electronics Information and Communication Engineers of Japan (D), vol. J80-D-II, No. 8, pp 2170. 2177 (1997)) or the like. Further, in the feature extraction unit 32, the feature amounts of the face in the face image are created based on the positional relation between the respective feature points. For example, in the feature extraction unit 32, a face region detected by the face detection unit 31 is subjected to a normalization process as feature amounts and an N-dimensional quantum vector f is created based on the positional relation between the feature points in the normalized face image.

The authentication unit 33 collates feature amounts (that are hereinafter also referred to as input face data) obtained from a face image input by the image input unit 22 and detected by the face detection unit 31 with feature amounts (that are hereinafter also referred to as registered face data) of a face image stored in the dictionary data unit 25. In the authentication unit 33, the similarity between the input face data and the registered face data stored in the dictionary data unit 25 is calculated. In the authentication unit 33, whether or not the similarity that becomes the largest one of the calculated similarities is larger than or equal to a preset threshold value is determined. If the similarity that becomes the largest one of the calculated similarities is larger than or equal to the preset threshold value, the authentication unit 33 determines that a person with the input face image is a person with the registered face image that gives the largest similarity.

For example, in the walker authentication unit 33 of the walker authentication system, collation is performed by use of a correlation subspace method in order to authenticate a person who is walking. In this case, input face data is created as the distribution (input subspaces) of feature vectors based on feature amounts obtained from a plurality of face images sequentially input in the feature extraction unit 32 and registration face data is previously registered as the distribution (registered subspaces) of feature vectors in the dictionary data unit 25. As a result, in the authentication unit 33, collation between the input subspace as input face data and the registered subspace as the registered face data is performed by use of the correlation subspace method.

The position determination unit 34 determines the position of the person based on the face image detected by the face detection unit 31. For example, the position determination unit 34 determines the position of a person in the passage based on a variation in the sizes of the face images in a plurality of images successively photographed by the camera 12. In this case, it is supposed that the camera 12 photographs a plurality of successive time series images (images of respective frames). Further, the position determination unit 34 determines the position and time in and at which the person has passed based on the position of the person. For example, the sizes (face sizes) of the face regions detected at the respective points are respectively set to $S_A$, $S_B$, $S_C$ for the point A, point B, point C in the passage. In this case, variations in the face sizes due to time series variations while walking are expressed by ..., $S_{t-1}$, $S_t$, $S_{t+1}$, .... For example, the position through which the person has passed at time t is derived by use of a DP method (Dynamic Programming) or the like.

The posture determination unit 35 determines the direction (posture) of a face based on the face image. That is, the posture determination unit 35 determines the direction of the face in the face image detected by the face detection unit 31. For example, the posture determination unit 35 determines the direction of a face based on a variation in the relative positions of the feature points of the face extracted by the feature extraction unit 32. For example, as the technique for determining the direction of a face based on a variation in the relative positions of the face feature points, a method described in Patent Document 1 (Jpn. Pat. Appln. KOKAI Publication No. 2003-141541) or the like can be applied.

The posture data collection unit 36 collects face feature amounts obtained from face images in various postures as posture variation data. In the posture data collection unit 36, face feature amounts obtained from face images in a plurality of preset postures are collected as posture variation data. That is, if the posture determined by the posture determination unit 35 is a preset posture, the posture data collection unit 36 collects face feature amounts obtained from the face image of the above posture. For example, in the posture data collection unit 36, an eigen value of a matrix R and a corresponding eigen vector are derived by using an autocorrelation matrix $R=(1/n_i)\Sigma_i ff^T$ based on an N-dimensional quantum vector for each of images (frames) sequentially input by the image input unit 22. The feature space for a label $L_i$ is configured by extracting N (>n) eigen vectors corresponding to eigen values arranged in a descending order.

Further, in the posture data collection unit 36, face feature amounts (distributions $D_A$, $D_B$, $D_C$ of feature vectors) obtained from face images of various postures at a preset point in the passage are collected as posture variation data. For example, when posture variation data is collected at the point A, point B, and point C in the passage, the posture data collection unit 36 collects face feature amounts obtained from the face images of various postures obtained by photographing a person at the point A, point B, and point C as posture variation data at the respective points.

The walking data collection unit 37 collects data associated with face images of a person who walks in the passage as walking data (time series pattern). The walking data collection unit 37 collects data obtained by setting the position in the passage, the posture (face direction), the face feature amounts and the like in correspondence to one another for a person who has actually passed in the passage as walking data. For example, when it is estimated by the position determination unit 34 that times at which the person is detected at the point A, point B, point C are $t=T_A$, $T_B$, $T_C$, the walking data collection unit 37 collects face feature amounts (distributions $D_{TA}$, $D_{TB}$, $D_{TC}$ of feature vectors) extracted from neighboring frames of $t=T_A$, $T_B$, $T_C$ as walking data indicating variations (predictable variations) when he actually walks along the passage in neighboring portions of the points A, B, C.

The synthesizing unit (dictionary data creation unit) 38 synthesizes posture data collected by the posture data collection unit 36 and walking data collected by the walking data collection unit 37 to create dictionary data.

For example, in the posture data collection unit 36, posture variation data items are previously collected at the point A, point B, point C. In this case, the distributions of feature vectors configured by posture variation data collected at the point A, point B, point C by the posture data collection unit 36 are set to $D_A$, $D_B$, $D_C$.

Further, in the walking data collection unit 37, the postures determined by the posture determination unit 35 in the neighboring frames of $t=T_A$, $T_B$, $T_C$ are collected as walking data indicating posture variations in neighboring portions of the point A, point B, point C. In this case, the distributions (input subspaces) of feature vectors configured by walking data collected by the walking data collection unit 37 at the point A, point B, point C are set as $D_{TA}$, $D_{TB}$, $D_{TC}$. That is, the distributions $D_{TA}$, $D_{TB}$, $D_{TC}$ of the feature vectors are the distributions of feature vectors configured by neighboring frames of $t=T_A$, $T_B$, $T_C$ estimated as times at which the person has actually walked through the points A, B, C.

Approximated distributions $D_A'$, $D_B'$, $D_C'$ of the feature vectors containing posture variations while actually walking at the points A, B, C are respectively configured by setting $D_A'=D_A+D_{TA}$, $D_B'=D_B+D_{TB}$, $D_C'=D_C+D_{TC}$. Therefore, the distributions $D_A'$, $D_B'$, $D_C'$ of the feature vectors are obtained by reflecting the distributions $D_{TA}$, $D_{TB}$, $D_{TC}$ of the feature vectors indicating variations (predictable variations) occurring when the person actually walks on the distributions $D_A$, $D_B$, $D_C$ of the feature vectors configured by posture variation data items collected at the points A, B, C. That is, the above distributions $D_A'$, $D_B'$, $D_C'$ of the feature vectors contain variations (predictable variations) occurring when the person actually walks in posture variation data items collected at the points A, B, C. As a result, in the synthesizing unit 38, the distribution of feature vectors created by synthesizing posture variation data and walking data is obtained as dictionary data.

Figure 5:
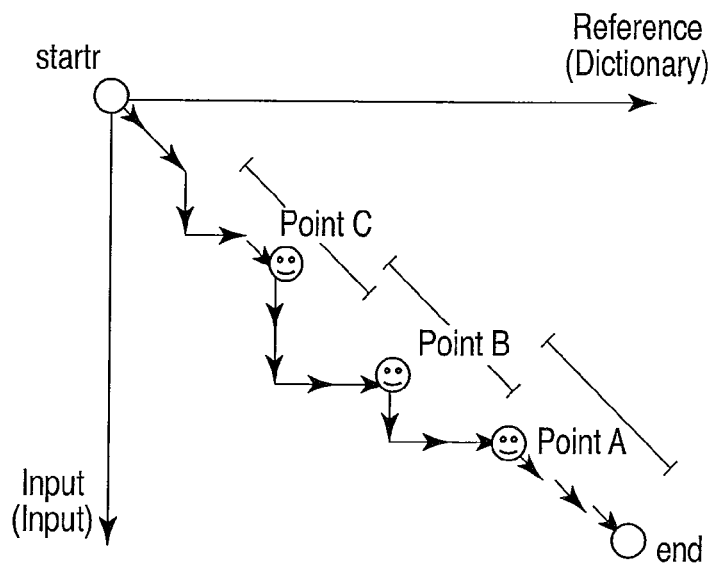
FIG. 5 shows an example in which the distribution of feature vectors in neighboring portions of the points A, B, C is mapped on a feature space.
Figure 6:
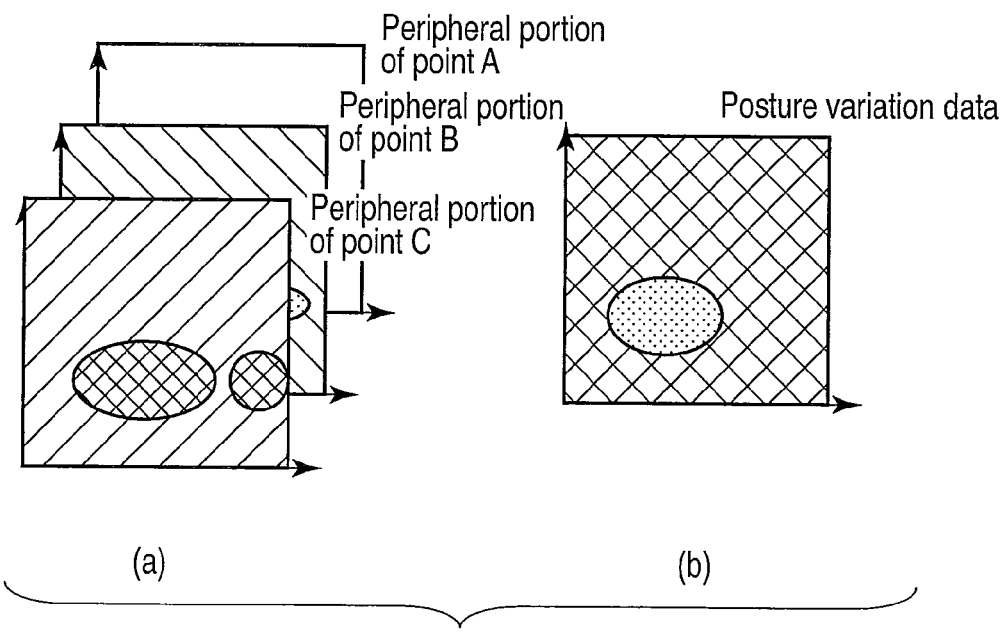
FIG. 6 is a view conceptually showing a synthesizing process of walking data and posture variation data.

Further, FIG. 5 shows an example in which the distributions of feature vectors in neighboring portions of the point A, point B, point C are mapped on a feature space. In the example shown in FIG. 5, the abscissa indicates dictionary data (Reference) and the ordinate indicates input data (Input). Each vector shown in FIG. 5 shows a state of a face image at each time. Therefore, in FIG. 5, when a person walks in the same manner as in a case of the registration time, each vector configures a straight line extending from a start point to an end point. That is, in the example shown in FIG. 5, it is indicated that the person walks along the passage while performing an operation different from that in the case of the registration time in a case wherein the person actually walks along the passage. Further, FIG. 6 is a view conceptually showing a synthesizing process of walking data and posture variation data. The distribution of feature vectors is created as dictionary data by synthesizing the distribution of feature vectors as walking data at the respective points as shown in FIG. 6(*a*) and the distribution of feature vectors as posture variation data as shown in FIG. 6(*b*).

Next, the registration process in the above walker authentication system of the first embodiment is explained.

Figure 8:
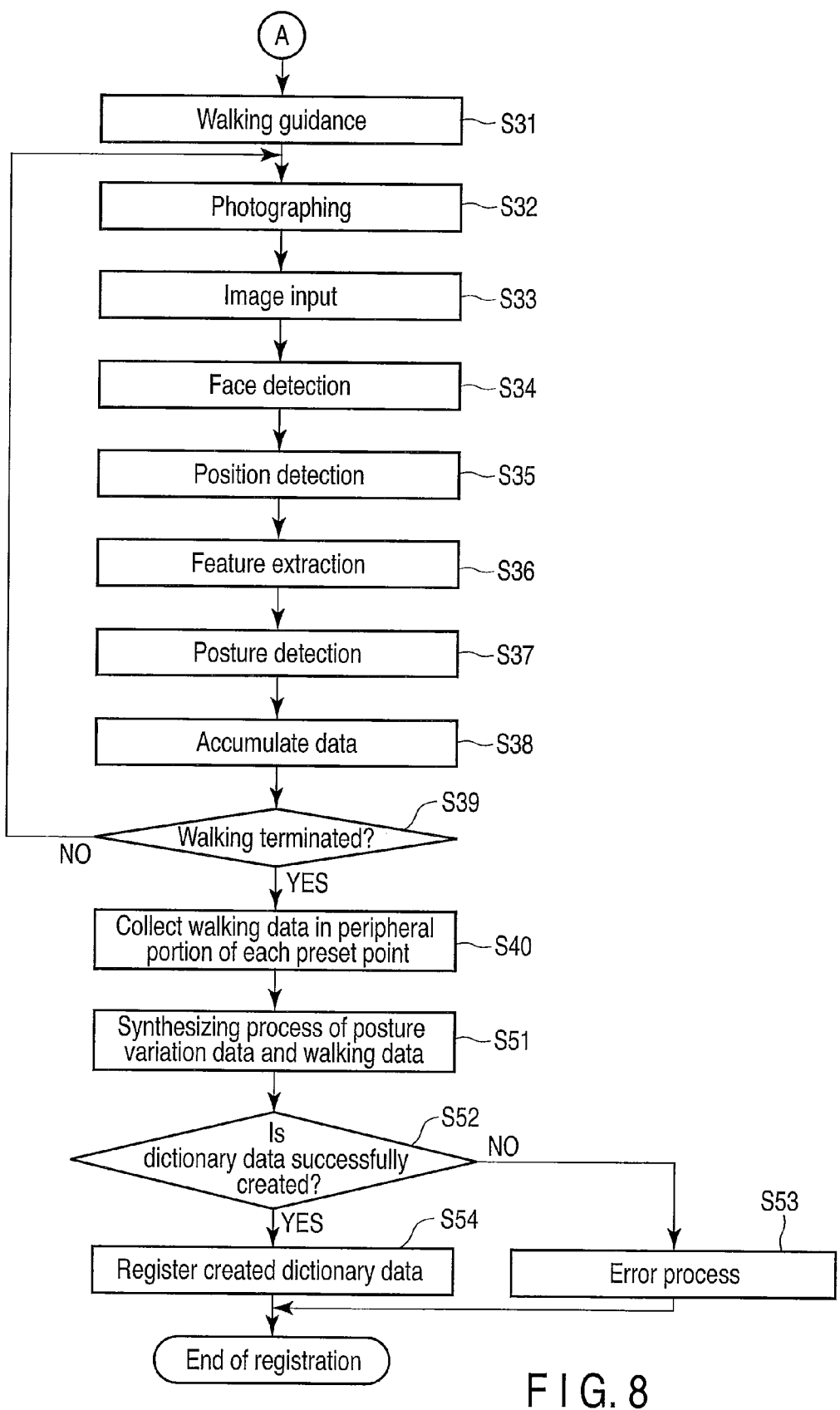
FIG. 8 is a flowchart for illustrating a walking data collection process and synthesizing process in the dictionary data registration process as the first embodiment.

FIG. 7 and FIG. 8 are flowcharts for illustrating an example of the registration process as the first embodiment.

The dictionary data registration process includes a process (posture variation data collection process) of first collecting posture variation data from a registrant at a plurality of points, a process (walking data collection process) of collecting walking data when the registrant actually walks along the passage and a process (synthesizing process) of synthesizing and registering the posture variation data and walking data. In FIG. 7 and FIG. 8, an example of the posture variation data collection process is a process of steps S11 to S23 that will be described later, an example of the walking data collection process is a process of steps S31 to S40 that will be described later and an example of the synthesizing process is a process of steps S51 to S54 that will be described later.

First, the example of the posture variation data collection process is explained.

When registration is started, the display control unit 24 displays a guidance screen that guides to the effect that the registrant moves to a first registered point on the display device 13 (step S11). Further, the camera 12 successively photographs images in the passage (step S12). The image input unit 22 sequentially receives images successively photographed by the camera 12 (step S13). When the images are input to the image input unit 22, the face detection unit 31 performs a process of detecting a face image (a face region of the face) from the input image (step S14). When the face image is extracted, the position determination unit 34 determines the position of the person (registrant) in the passage based on the size of the detected face image (step S15). If it is determined by the above determination that the position of the registrant is not a desired registration point (NO in step S16), the processing unit 21 returns the process to step S11 and causes the display control unit 24 to display guidance to the effect that he moves to a desired registration point on the display device 13.

Further, if it is determined by the above determination that the position of the registrant is a desired registration point (YES in step S16), the feature extraction unit 32 performs a process of extracting face feature points and face feature amounts based on the feature points from the face image detected by the face detection unit 31 (step S17). If the face feature points are extracted by the feature extraction unit 32, the posture determination unit 35 performs a process of determining the posture (face direction) based on the relative positional relation between the extracted face feature points (step S18). In this case, it is supposed that various postures are previously determined as postures to be registered. Therefore, it is supposed that the face feature amounts extracted from the face image of the previously determined posture are extracted as posture variation data.

That is, the posture determination unit 35 determines whether or not the determination result of the posture is a desired posture (an uncollected posture among the preset postures) (step S19). If it is determined by the posture determination that the posture is not a desired posture (NO in step S19), the processing unit 21 causes the display control unit 24 to display a guidance screen that urges the registrant to take a desired posture on the display device 13 (step S22) and returns the process to step S12. In this case, the guidance that urges him to change a posture displayed on the display device 13 may be guidance that suggests changes of postures in a preset sequence (for example, guidance that specifies the face direction as shown in FIG. 2) or guidance that suggests changes of postures in a given sequence.

Further, if it is determined by the above posture determination that the posture is a desired posture (YES in step S19), the posture data collection unit 36 collects face feature amounts extracted by the feature extraction unit 32 as feature amounts of the face in the above posture (step S20). When collecting the feature amounts of the face in the above posture, the processing unit 21 determines whether or not collection of the feature amounts (posture variation data) of the face in various preset postures at the above point is completed (step S21).

If it is determined in the above determination that collection of the posture variation data at the above point is not completed, that is, if it is determined that an uncollected posture remains among the various postures to be collected at the above point (YES in step S21), the processing unit 21 causes the display control unit 24 to display a guidance screen that urges the registrant to take a desired posture (an uncollected posture among the various postures to be collected) on the display device 13 (step S22) and returns the process to step S12.

Further, if it is determined in the above determination that collection of the posture variation data at the above point is completed (YES in step S21), the posture data collection unit 36 completes collection of the posture variation data at the above point. At this time, the posture data collection unit 36 configures distributions ($D_A$, $D_B$, $D_C$) of feature vectors as posture variation data items at the above points (points A, B, C).

When collection of posture variation data at a certain point is completed (YES in step S21), the processing unit 21 determines whether or not collection of posture variation data at all of the preset points is completed (step S23). If it is determined in the above determination that collection of the posture variation data at all of the points is not completed (NO in step S23), the processing unit 21 returns the process to step S11 and causes the display control unit 24 to display guidance that urges him to move to a point at which collection of posture variation data is not completed on the display device 13. Further, normally, it provides guidance to collect posture variation data at each point in a passage route of the passage (for example, a route leading to a position far apart from the camera). For example, with the configuration shown in FIG.

1, it provides guidance to collect posture variation data in an order of the point C, point B, point A. Further, if it is determined in the above determination that collection of the posture variation data at all of the points is completed (YES in step S23), the processing unit 21 carries on the process to step S31, terminates the posture variation data collection process and performs the walking data collection process.

Next, an example of the walking data collection process is explained.

When the posture variation data collection process is terminated, the processing unit 21 causes the display control unit 24 to display guidance to the effect that he actually walks along the passage on the display device 13 (step S31). Further, the camera 12 successively photographs images in the passage (step S32). The image input unit 22 sequentially receives images successively photographed by the camera 12 (step S33). When the image input unit 22 receives the image, the face detection unit 31 performs a process of detecting a face image (the face region of a face) from the input image (step S34).

When the face image is detected, the position determination unit 34 determines a position of the person (registrant) in the passage based on the size of the detected face image or the like (step S35). Further, the feature extraction unit 32 performs a process of extracting face feature points and face feature amounts based on the feature points from the face image detected by the face detection unit 31 (step S36). When the face feature points are extracted by the feature extraction unit 32, the posture determination unit 35 performs a process of determining the posture (face direction) based on the relative positional relation between the extracted face feature points (step S37). Data of the position detection result, feature amounts, posture detection result and the like obtained by the above processes is accumulated in a memory that is not shown in the drawing in the walking data collection unit 37 (step S38).

Further, after the walking data collection process is started, the processing unit 21 determines whether or not walking of the registrant in the passage is terminated (step S39). For example, the processing unit 21 determines whether or not walking of the registrant in the passage is terminated based on the position determination result by the position determination unit 34. Further, the processing unit 21 may determine whether or not walking of the registrant in the passage is terminated based on the face detection result by the face detection unit 31.

The processing unit 21 repeatedly performs a process of steps S32 to S39 until it is determined that walking of the registrant in the passage is terminated (NO in step S39). As a result, data obtained until walking is terminated is accumulated in the memory.

If it is determined that walking of the registrant in the passage is completed (YES in step S39), the walking data collection unit 37 performs a process of collecting walking data in a peripheral portion of each preset point (step S40). The walking data in the peripheral portion of each point is selected based on the position detection result from the position determination unit 34. For example, the walking data collection unit 37 selects feature amounts obtained from a neighboring frame at time at which he has passed through each point that is estimated by the position determination unit 34 as walking data in the peripheral portion of each point. Further, the walking data collection unit 37 configures distributions ($D_{TA}$, $D_{TB}$, $D_{TC}$) of feature vectors in the peripheral portions of the respective points (points A, B, C) based on the selected data. By the above process, walking data in the peripheral portion of each point obtained when the registrant actually walks along the passage is collected.

Next, an example of the synthesizing process is explained.

When the posture variation data collection process and walking data collection process are completed, the synthesizing unit 38 performs a process of synthesizing posture variation data collected by the posture data collection unit 36 and walking data collected by the walking data collection unit 37 (step S51). In this case, it is supposed that posture variation data is collected as distributions $D_A$, $D_B$, $D_C$ of feature vectors at the points A, B, C. Further, it is supposed that walking data is collected as distributions $D_{TA}$, $D_{TB}$, $D_{TC}$ of feature vectors in peripheral portions of the points A, B, C. In this case, the posture variation data and walking data are synthesized as approximated distributions $D_A'$, $D_B'$, $D_C'$ of feature vectors containing posture variations while actually walking at the points A, B, C as described before. That is, the approximated distributions $D_A'$, $D_B'$, $D_C'$ of the feature vectors used as the synthesized dictionary data are configured as $D_A'=D_A+D_{TA}$, $D_B'=D_B+D_{TB}$, $D_C'=D_C+D_{TC}$.

When the posture variation data and walking data are successfully synthesized as described above, that is, when dictionary data is successfully formed (YES in step S52), the synthesizing unit 38 registers the formed dictionary data as registration data of the registrant into the dictionary data unit (step S54). Further, if the posture variation data or walking data is insufficient, the synthesizing unit 38 determines that formation of dictionary data has resulted in failure (NO in step S52). In such a case (NO in step S52), the processing unit 21 performs an error process (step S53). As the error process, for example, a process of displaying that registration has failed on the display device 13 is performed.

As described above, in the first embodiment, posture variation data is collected from a plurality of face images obtained by photographing the face of a registrant whose posture (face direction) is varied, further, walking data is collected from face images obtained by photographing the face of the registrant who is actually walking along the passage, dictionary data is formed by synthesizing the posture variation data and walking data, and the formed dictionary data is registered as dictionary data used to authenticate a person who walks in the passage by face collation. Thus, dictionary data that not only simply corresponds to posture variations but also reflects the trend (predictable variation) when he actually walks along the passage can be formed. As a result, dictionary data used to perform face collation with high precision can be formed and registered without imposing a heavy load on the user.

Next, a modification of the first embodiment is explained.

In the first embodiment described above, it is explained on the assumption that posture variation data is collected at a plurality of points in the passage. However, a state may occur in which it is difficult to collect posture variation data at plural points, depending on an operation form. For example, when posture variation data is not collected at plural points in order to preferentially alleviate the load on the user, it is considered that the passage length is short and posture variation data cannot be collected at plural points at the registration time. In the modification of the first embodiment, the above operation is realized by collecting posture variation data at least once (collecting posture variation data at one point) in the above-described case.

The following explanation is explained on the assumption that posture variation data is collected only at the point A, for example, in the above walker authentication system.

First, it is considered that distribution $D_A$ of feature vectors configured by data collected at the point A is derived based on an autocorrelation matrix $R=(1/n_i)\Sigma_i(R(\theta)f)(R(\theta)f)^t$ by using R(θ) as a posture variation parameter. Then, previous distribution (distribution of feature vectors) $D_A'$ containing a variation that can be predicted by use of distribution $D_{TA}$ of feature vectors configured by neighboring frames of $t=T_A$ can be acquired by a process of $D_A'=D_A+D_{TA}$.

Further, distribution $D_B$ of feature vectors as posture variation data at the point B can be estimated based on an autocorrelation matrix $R'=(1/n_i)\Sigma_i(R(\theta')f)(R(\theta')f)^t$ by using $R(\theta')$ as a posture variation parameter according to a difference between posture variation data items at the point A and point B. Therefore, distribution $D_B'$ of feature vectors can be created based on $D'=D_B+D_{TB}$ by use of distribution $D_{TB}$ of feature vectors as walking data in peripheral portions of the point B configured by neighboring frames of $t=T_B$ in the posture data collection unit 36 or synthesizing unit 38. By use of the similar method, also, at the point C, distribution $D_C$ of feature vectors as posture variation data at the point C can be estimated. That is, distribution $D_C'$ of feature vectors can be created based on $D'=D_C+D_{TC}$ by use of distribution $D_{TC}$ of feature vectors as walking data in peripheral portions of the point C configured by neighboring frames of $t=T_C$.

As described above, according to the modification of the first embodiment, posture variation data at each preset point can be stably acquired by use of posture variation data collected at one point and synthesized with walking data to create dictionary data. As a result, the load of the user at the registration time can be alleviated and dictionary data with a high collation precision can be efficiently formed.

Next, a second embodiment is explained.

The second embodiment is designed to further form dictionary data obtained by synthesizing environment variations such as illumination with dictionary data formed by the process explained in the first embodiment. In the face collation process, the collation precision may be influenced by an environment when the face image is photographed. For example, generally, the collation precision is lowered in a case wherein two face images photographed in environments with different brightness are collated or two face images photographed in environments in which directions of light to illuminate the face are different in comparison with a case wherein two face images photographed in environments with the same brightness are collated. Therefore, the collation precision can be enhanced by synthesizing information formed by taking an environment variation into consideration with the dictionary data.

In the second embodiment explained below, information corresponding to an illumination variation as an environment variation is synthesized with dictionary data.

Figure 9:
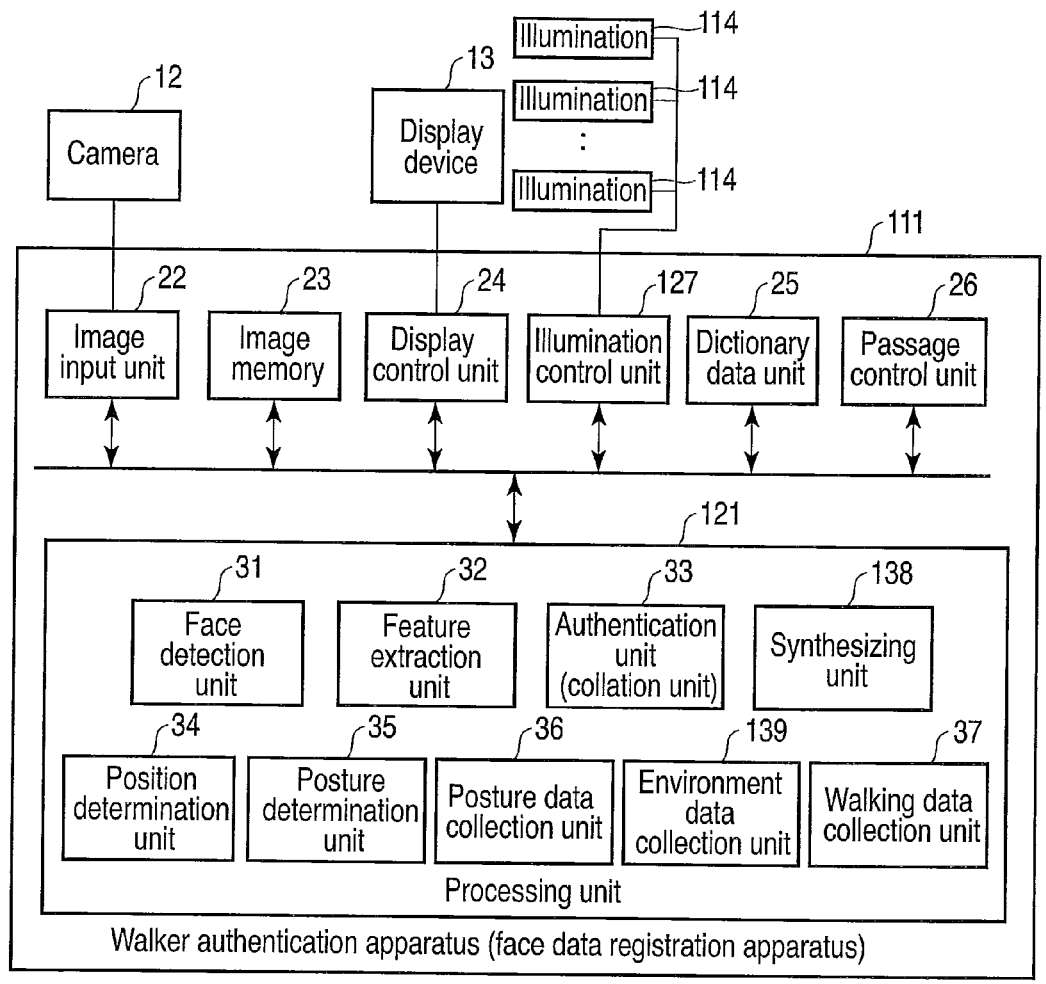
FIG. 9 is a block diagram showing an example of the configuration of a walker authentication system according to a second embodiment.

FIG. 9 is a block diagram showing an example of the configuration of a walker authentication system according to the second embodiment. In this case, it is supposed that the walker authentication system performs an operation form as shown in FIG. 1, for example.

The walker authentication system is configured by a walker authentication apparatus 111, camera 12, display device 13, a plurality of lights 114 and the like. The camera 12 and display device 13 in the walker authentication system shown in FIG. 9 are the same as those shown in FIG. 1 or FIG. 4, and therefore, the detailed explanation is omitted. In this case, in order to photograph face images of various postures of a registrant in front of the display device 13, a plurality of cameras may be installed with various angles. Thus, the load on the user to collect posture variation data can be alleviated. Also, in this case, posture variation data equivalent to a case wherein posture variation data is obtained based on face images of the registrant whose posture is varied according to guidance displayed on the display device 13 can be obtained.

Further, as shown in FIG. 9, the walker authentication apparatus 111 is configured by a processing unit 121, image input unit 22, image memory 23, display control unit 24, dictionary data unit 25, passage control unit 26, illumination control unit 127 and the like. Further, as shown in FIG. 4, the processing unit 121 has functions of a face detection unit 31, feature extraction unit 32, authentication unit (collation unit) 33, position determination unit 34, posture determination unit 35, posture data collection unit 36, walking data collection unit 37, synthesizing unit (dictionary data creation unit) 138, environment data collection unit 139 and the like as functions realized by executing various programs. In this case, for the same constituents as the walker authentication apparatus 111 shown in FIG. 9 and the walker authentication apparatus 11 shown in FIG. 4, the same portions are denoted by the same symbols and the detailed explanation is omitted.

For example, the plural lights 114 are disposed near the display device 13. The plural lights 114 illuminate the face of a person existing in front of the display device 13 with various levels of brightness and in various directions. The lights 114 are controlled by the illumination control unit 127 of the walker authentication apparatus 111 to intentionally change the photographing condition (environment such as illumination) for the face of the person.

The environment data collection unit 139 collects feature amounts of the face in various environment (illumination) conditions as environment variation data. In the environment data collection unit 139, feature amounts of the face obtained from face images photographed in various illumination conditions are collected as environment variation data. That is, the environment data collection unit 139 collects feature amounts of the face obtained from face images photographed in various illumination conditions controlled by the illumination control unit 127 as environment variation data. For example, in this case, in the environment data collection unit 139, if the environment variation parameter is set to $L(\theta_i)$, an eigen value of a matrix R and an eigen vector corresponding thereto are obtained based on the autocorrelation matrix $R=(1/n_i)\Sigma_i(L(\theta)f)(L(\theta)f)^t$. This is supposed to be environment variation data $D_L$.

Further, in the posture data collection unit 36, posture variation data of a face in front of the display device 13 is collected by use of the same method as in the first embodiment. That is, it is supposed that the posture data collection unit 36 collects feature amounts of the face obtained from face images obtained by photographing the face of a registrant in various postures in front of the display device 13 as posture variation data. In this case, if the posture variation parameter is set to $R(\theta_i)$, an eigen value of a matrix R and an eigen vector corresponding thereto are obtained based on the autocorrelation matrix $R=(1/n_i)\Sigma_i(R(\theta_i)f)(R(\theta_i)f)^t$. This is supposed to be posture variation data $D_{PNL}$.

Further, like the first embodiment, the walking data collection unit 37 collects data associated with face images of a person who walks in the passage as walking data (time series pattern). For example, the walking data collection unit 37 estimates the time ($t=T_A$) at which the person is detected at the point A and creates distribution (subspace) of feature vectors as walking data by using an autocorrelation matrix $R=(1/2\epsilon)\Sigma^{|t-TA|<\epsilon}(f)(f)^t$ that is created based on feature amounts (feature vectors) of the face extracted from neighboring frames of $t=T_A$.

The synthesizing unit (dictionary data creation unit) 38 synthesizes the posture variation data $D_{PNL}$ collected by the posture data collection unit 36, the environment variation data $D_L$ collected by the environment data collection unit 139 and the walking data $D_T$ collected by the walking data collection unit 37 to create dictionary data. In this case, it is possible to create distribution (subspace) of feature vectors obtained by projecting the posture variation data $D_{PNL}$ collected by the posture data collection unit 36 onto the walking data $D_T$ collected by the walking data collection unit 37 and distribution (subspace) of feature vectors obtained by projecting the environment variation data $D_L$ collected by the environment data collection unit 139 onto the walking data $D_T$ collected by the walking data collection unit 37 as dictionary data.

Next, the operation of a registrant at the registration processing time of the walker authentication system of the second embodiment is schematically explained.

As described above, in the second embodiment, dictionary data is created by collecting the posture variation data, environment variation data and walking data and synthesizing the data items. In this case, it is supposed that the posture variation data and environment variation data are collected from images obtained by photographing the face of a registrant at a point set as a registration point in front of the display device 13.

Figure 10:
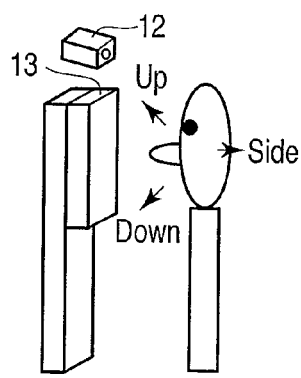
FIG. 10 is a view schematically showing a state set when posture variation data is collected.

FIG. 10 is a view schematically showing a state set when posture variation data is collected.

As shown in FIG. 10, when posture variation data is collected, the registrant takes various postures in front of the display device 13. At this time, the registrant changes the posture according to guidance to the effect that the posture displayed on the display device 13 is to be changed. The face of the registrant in the posture corresponding to the above guidance is photographed by the camera 12. Therefore, in the posture variation data collection process, face images of the registrant in various postures corresponding to the guidance are photographed and feature amounts of the face are collected as posture variation data from the face images.

Figure 11:
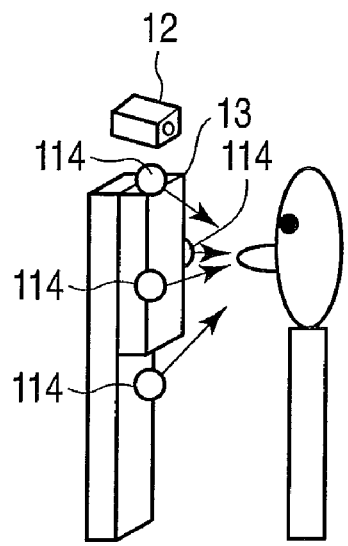
FIG. 11 is a view schematically showing a state set when environment variation data is collected.

FIG. 11 is a view schematically showing a state set when environment variation data is collected.

As shown in FIG. 11, when environment variation data is collected, face images of the registrant in front of the display device 13 are photographed in various illumination conditions. At this time, the respective lights 114 are controlled in various preset conditions. In the respective illumination conditions, the camera 12 photographs face images of the registrant. That is, in the environment variation data collection process, face images of the registrant are photographed in various preset illumination conditions and feature amounts of the face are collected as environment variation data from the face images.

Figure 12:
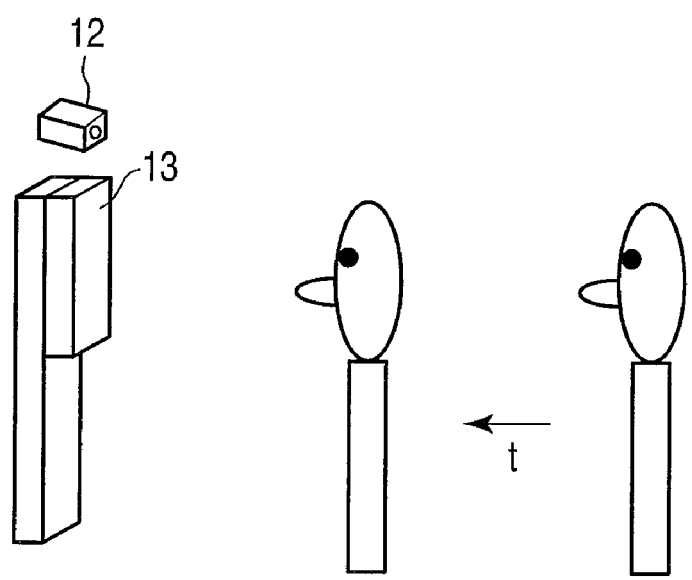
FIG. 12 is a view schematically showing a state set when walking data is collected.

FIG. 12 is a view schematically showing a state set when walking data is collected.

As shown in FIG. 12, when walking data is collected, face images of the registrant who is walking are photographed. That is, in the walking data collection process, face images of the registrant are photographed while the registrant is actually walking and feature amounts of the face are collected as walking data from the face images.

Next, the registration process in the walker authentication system of the second embodiment is explained.

Figure 13:
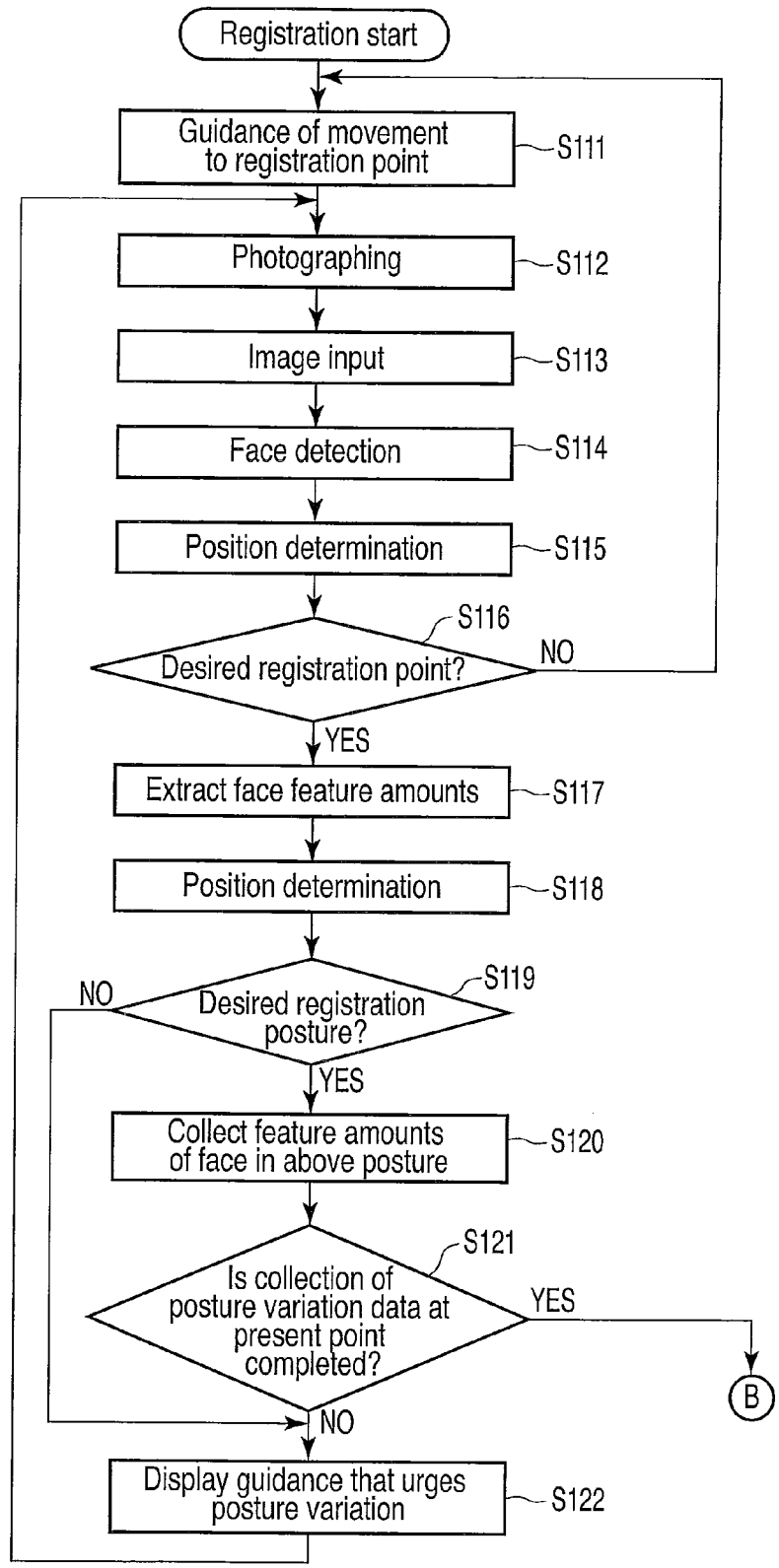
FIG. 13 is a flowchart for illustrating a posture variation data collection process in a dictionary data registration process as the second embodiment.
Figure 14:
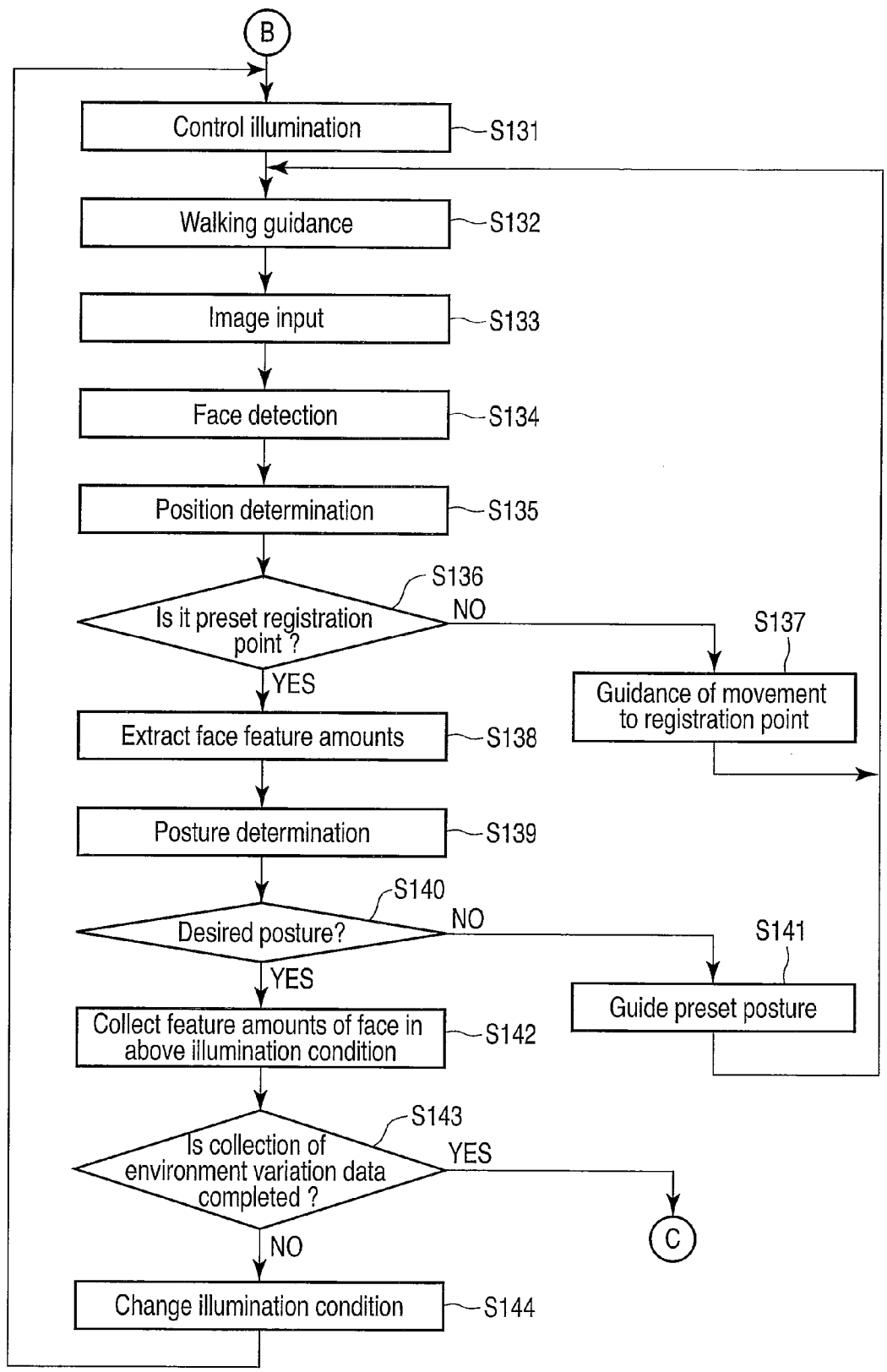
FIG. 14 is a flowchart for illustrating an environment variation data collection process in the dictionary data registration process as the second embodiment.
Figure 15:
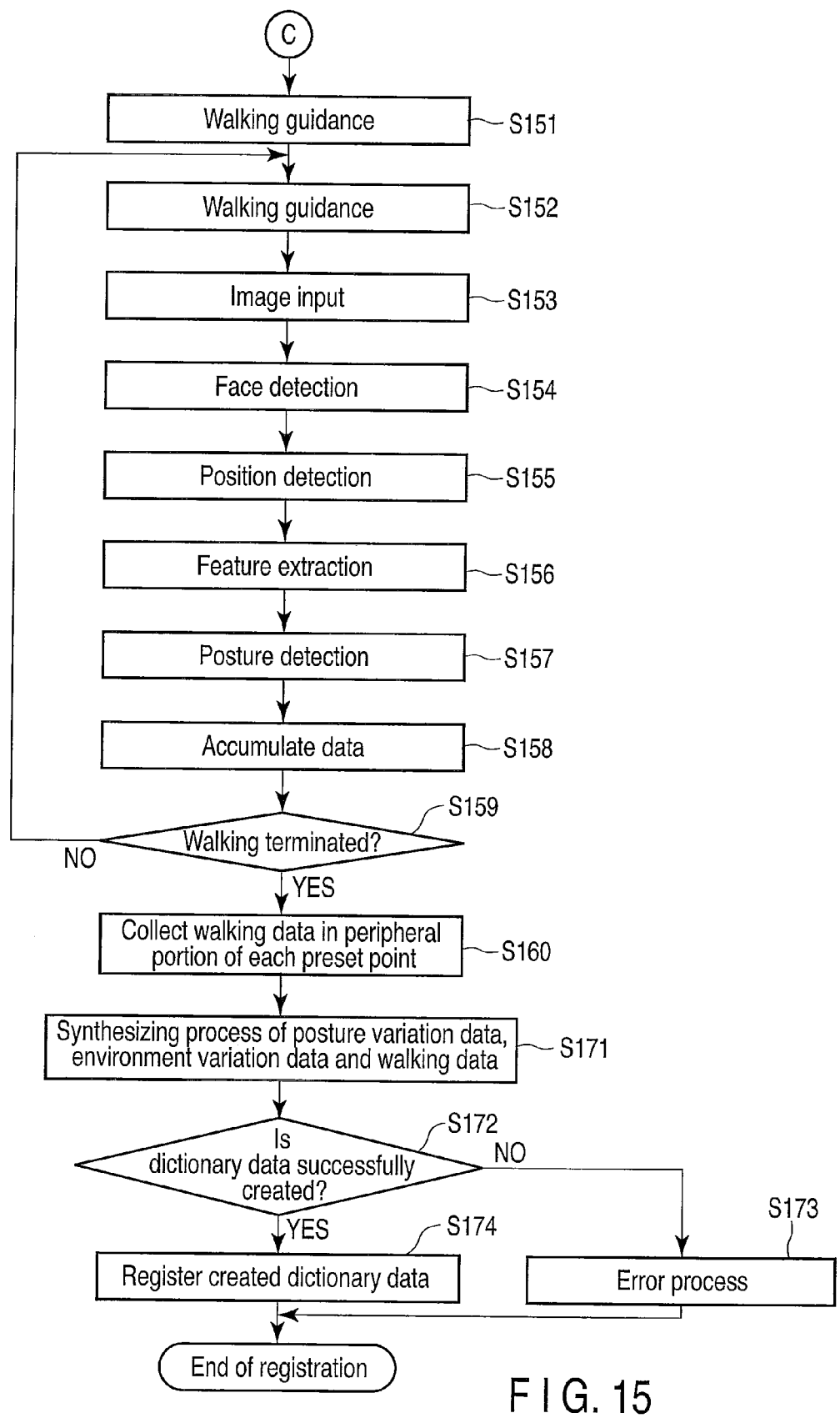
FIG. 15 is a flowchart for illustrating a walking data collection process and synthesizing process in the dictionary data registration process as the second embodiment.

FIG. 13, FIG. 14 and FIG. 15 are flowcharts for illustrating an example of a dictionary data registration process as the second embodiment.

The dictionary data registration process includes a process of collecting posture variation data (posture variation data collection process), a process of collecting environment variation data (environment variation data collection process), a process of collecting walking data when the registrant actually walks along the passage (walking data collection process), and a process of synthesizing the posture variation data, environment variation data and walking data and registering the synthesized data as dictionary data (synthesizing process).

In FIG. 13, FIG. 14 and FIG. 15, an example of the posture variation data collection process is a process of steps S111 to S122 that will be described later, an example of the environment variation data collection process is a process of steps S131 to S144 that will be described later, an example of the walking data collection process is a process of steps S151 to S160 that will be described later, and an example of the synthesizing process is a process of steps S171 to S174 that will be described later. Further, the posture variation data collection process, environment variation data collection process and walking data collection process are not limited to an order as indicated in FIG. 13, FIG. 14 and FIG. 15, but can be performed in any desired order.

First, an example of the posture variation data collection process is explained.

When registration is started, the display control unit 24 displays a guidance screen that guides the registrant to move to an area in front of the display device 13 on the display device 13 (step S111). Further, the camera 12 photographs an image (face image) containing a face of a person in front of the display device 13 (step S112). The image input unit 22 acquires images successively photographed by the camera 12 (step S113). When the image input unit 22 acquires images, the face detection unit 31 performs a process of detecting a face image (a face region of the face) from the acquired images (step S114). When the face image is extracted, the position determination unit 34 determines whether or not the person (registrant) exists at a preset registration point based on the size of the detected face image or the like (step S115). If it is determined by the above determination that the position of the registrant is not the preset registration point (NO in step S116), the processing unit 21 returns the process to step S111 and causes the display control unit 24 to display guidance to the effect that he is to move to the preset registration point on the display device 13.

Further, if it is determined by the above determination that the position of the registrant is the preset registration point (YES in step S116), the feature extraction unit 32 performs a process of extracting face feature points and face feature amounts based on the above feature points from the face image detected by the face detection unit 31 (step S117). When the face feature points are extracted by the feature extraction unit 32, the posture determination unit 35 performs a process of determining a posture (face direction) based on the relative positional relation between the extracted face feature points (step S118). In this case, it is supposed that various postures are previously determined as postures to be registered. Therefore, it is supposed that face feature amounts extracted from the face image of the previously determined posture are extracted as posture variation data.

That is, the posture determination unit 35 determines whether or not the determination result of the posture is a desired posture (an uncollected posture among the preset postures) (step S119). If it is determined by the posture determination that the posture is not the desired posture (NO in step S119), the processing unit 21 causes the display control unit 24 to display a display screen that urges the registrant to take a desired posture on the display device 13 (step S122) and returns the process to step S112. In this case, the guidance displayed on the display device 13 to urge him to change the posture may be guidance (for example, guidance instructing the face direction as shown in FIG. 2) to change postures in a preset order or guidance to change postures in a given order.

Further, if it is determined by the above posture determination that the posture is the desired posture (YES in step S119), the posture data collection unit 36 collects face feature amounts extracted by the feature extraction unit 32 as face feature amounts in the above posture (step S120). When the feature amounts of the face in the above posture are collected, the processing unit 21 determines whether collection of feature amounts (posture variation data) of the face in various preset postures at the above point is completed or not (step S121).

If it is determined by the above determination that collection of posture variation data at the above point is not completed, that is, if it is determined that an uncollected posture among the various postures to be collected at the above point is present (YES in step S121), the processing unit 21 causes the display control unit 24 to display a guidance screen that urges the registrant to take a desired posture (an uncollected posture among the various postures to be collected) on the display device 13 (step S122) and returns the process to step S112.

Further, if it is determined by the above determination that collection of posture variation data at the above point is completed (YES in step S121), the posture data collection unit 36 completes collection of posture variation data at the above point. At this time, the posture data collection unit 36 configures distribution $D_{PNL}$ of feature vectors as posture variation data at the above point.

When collection of posture variation data in front of the display device 13 (at a preset registration point) is completed (YES in step S121), the processing unit 21 carries on the process to step S131, terminates the posture variation data collection process and starts the environment data collection process. In a case where the posture variation data is collected at plural points, a process of collecting posture variation data as described above is performed at each point like the first embodiment. Further, it is also possible to create posture variation data at plural points (for example, points A, B, C) by use of posture variation data collected at one preset point by the method explained in the modification of the first embodiment.

Next, an example of the environment variation data collection process is explained.

When the environment variation data collection process is completed, the processing unit 21 causes the illumination control unit 127 to control (light) the respective lights 114 in preset illumination conditions (step S131). Then, the camera 12 photographs an image (face image) containing a face of a person in front of the display device 13 (step S132). The image input unit 22 acquires an image photographed by the camera 12 (step S133). If the image input unit 22 acquires the image, the face detection unit 31 performs a process of detecting a face image (a face region of the face) from the acquired image (step S134). If the face image is extracted, the position determination unit 34 determines whether or not the person (registrant) exists at a preset registration point based on the size of the detected face image or the like (step S135). If it is determined by the above determination that the position of the registrant is not the preset registration point (NO in step S136), the processing unit 21 causes the display control unit 24 to display guidance to the effect that he is to move to a preset registration point on the display device 13 and returns the process to step S132.

Further, if it is determined by the above determination that the position of the registrant is the preset registration point (YES in step S136), the feature extraction unit 32 performs a process of extracting face feature points and face feature amounts based on the feature points from the face image detected by the face detection unit 31 (step S137). If the face feature points are extracted by the feature extraction unit 32, the posture determination unit 35 performs a process of determining the posture (face direction) based on the relative positional relation between the extracted face feature points (step S138). In this case, it is supposed that face images photographed in various illumination conditions are set in a preset posture. Therefore, the posture determination unit 35 determines whether or not the posture determination result is a preset posture (step S139). If it is determined by the posture determination that it is not a preset posture (NO in step S140), the processing unit 21 causes the display control unit 24 to display a guidance screen that urges the registrant to take a preset posture on the display device 13 (step S141) and returns the process to step S132.

Further, if it is determined by the above posture determination that the posture is a preset posture (YES in step S140), the posture data collection unit 36 collects face feature amounts extracted by the feature extraction unit 32 as face feature amounts in the above illumination condition (step S142). When the face feature amounts in the above illumination condition are collected, the processing unit 21 determines whether or not collection of feature amounts (environment variation data) of the face in various preset illumination conditions is completed (step S143).

If it is determined by the above determination that collection of environment variation data is not completed (YES in step S143), the processing unit 21 sets a different illumination condition (an uncollected posture among various postures to be collected) (step S144) and returns the process to step S131. Thus, illumination is controlled in the different illumination condition and face feature amounts in the above illumination condition are collected.

Further, if it is determined by the above determination that collection of environment variation data is completed (YES in step S143), the posture data collection unit 36 creates distribution $D_{PNL}$ of feature vectors as the environment variation data by use of the collected face feature amounts. As a result, the processing unit 21 carries on the process to step S151, terminates the environment variation data collection process and starts the walking data collection process. When the environment variation data is collected at plural points, a process of collecting environment variation data as described above may be performed at each point. Further, it is also possible to create environment variation data at plural points (for example, points A, B, C) by use of environment variation data collected at one preset point by the method explained in the modification of the first embodiment.

Next, an example of the walking data collection process is explained.

When the environment variation data collection process is completed, the processing unit 21 causes the display control unit 24 to display guidance to the effect that he actually walks along the passage on the display unit 13 (step S151). Further, the camera 12 successively photographs images in the passage (step S152) and sequentially supplies the photographed images to the image input unit 22 (step S153). If the image is input to the image input unit 22, the face detection unit 31 performs a process of detecting a face image (a face region of the face) based on the input image (step S154).

When the face image is detected, the position determination unit 34 determines the position of the person (registrant) in the passage based on the size of the detected face image or the like (step S155). Further, the feature extraction unit 32 performs a process of extracting face feature points and face feature amounts based on the feature points from the face image detected by the face detection unit 31 (step S156).

When the face feature points are extracted by the feature extraction unit 32, the posture determination unit 35 performs a process of determining the posture (face direction) based on the relative positional relation between the extracted face feature points (step S157). Data of the position detection result, feature amounts, posture detection result and the like obtained by the above processes is accumulated in a memory that is not shown in the drawing in the walking data collection unit 37 (step S158).

Further, after the walking data collection process is started, the processing unit 21 determines whether or not walking of the registrant in the passage is terminated (step S159). For example, the processing unit 21 determines whether or not walking of the registrant in the passage is terminated based on the position determination result by the position determination unit 34. Further, the processing unit 21 may determine whether or not walking of the registrant in the passage is terminated based on the face detection result by the face detection unit 31.

The processing unit 21 repeatedly performs the process of steps S32 to S39 until it is determined that walking of the registrant in the passage is terminated (NO in step S159). As a result, data obtained until walking is terminated is accumulated in the memory.

If it is determined that walking of the registrant in the passage is completed (YES in step S159), the walking data collection unit 37 performs a process of collecting walking data in a peripheral portion of each preset point (step S160). The walking data in the peripheral portion of each point is selected based on the position detection result or the like by the position determination unit 34. For example, the walking data collection unit 37 selects feature amounts obtained from a neighboring frame at a time at which he has passed through each point that is estimated by the position determination unit 34 as walking data in the peripheral portion of each point and configures the distributions ($D_{TA}$, $D_{TB}$, $D_{TC}$) of feature vectors in the peripheral portions of the respective points (points A, B, C) based on the above data. Walking data in the peripheral portion of each point obtained when the registrant actually walks along the passage is collected by the above process.

Next, an example of the synthesizing process is explained.

When the posture variation data collection process and walking data collection process are completed, the synthesizing unit 38 performs a process of synthesizing the posture variation data collected by the posture data collection unit 36, the environment variation data collected by the environment data collection unit 139 and the walking data collected by the walking data collection unit 37 (step S171). In this case, as described above, the synthesizing process of the posture variation data, environment variation data and walking data is designed to create dictionary data as distributions (subspaces) of feature vectors obtained by respectively projecting a distribution (subspace) of feature vectors as posture variation data, distribution (subspace) of feature vectors as environment variation data, and a distribution (subspace) of feature vectors as walking data.

When the posture variation data, environment variation data and walking data described above are successfully synthesized, that is, when dictionary data is successfully created (YES in step S172), the synthesizing unit 138 registers the created dictionary data as registration data of the registrant into the dictionary data unit 25 (step S174). Further, if the posture variation data, environment data or walking data is insufficient, the synthesizing unit 138 determines that formation of dictionary data has resulted in failure (NO in step S172). In such a case (NO in step S172), the processing unit 21 performs an error process (step S173). As the error process, for example, a process of displaying that registration has failed on the display device 13 is performed.

As described above, in the second embodiment, posture variation data is collected based on a plurality of face images obtained by photographing the face of a registrant whose posture (face direction) is varied, environment variation data is collected based on a plurality of face images of the registrant photographed in a state in which the illumination condition is varied; further, walking data is collected based on face images obtained by photographing the face of the registrant who actually walks along the passage; dictionary data is formed by synthesizing the posture variation data, environment variation data and walking data; and the formed dictionary data is registered as dictionary data used to authenticate a person who walks in the passage by face collation.

Thus, in the walker authentication system of the second embodiment, dictionary data that not only simply corresponds to posture variations and environment variations but also reflects the trend (predictable variation) when a person actually walks along the passage can be created. As a result, dictionary data with which face collation can be performed with high precision without imposing a heavy load on the user can be created and registered.

Next, a third embodiment is explained.

In the third embodiment, posture variation data is collected based on face photographs or face image data stored in a memory used as a storage medium. Further, walking data of a person whose posture variation data is collected is collected while a person whose posture variation data is collated and becomes coincident with feature amounts obtained from face images photographed by the camera or a person specified by the manager is walking along the passage. That is, the third embodiment is designed to create dictionary data without causing a person (registrant) to pay any attention to a registration process. It is supposed that the process of the third embodiment explained below is a process performed according to substantially the same flow as in the first embodiment (modification of the first embodiment) except that an input source of face images used to collect posture variation data is a photograph or storage medium.

Figure 16:
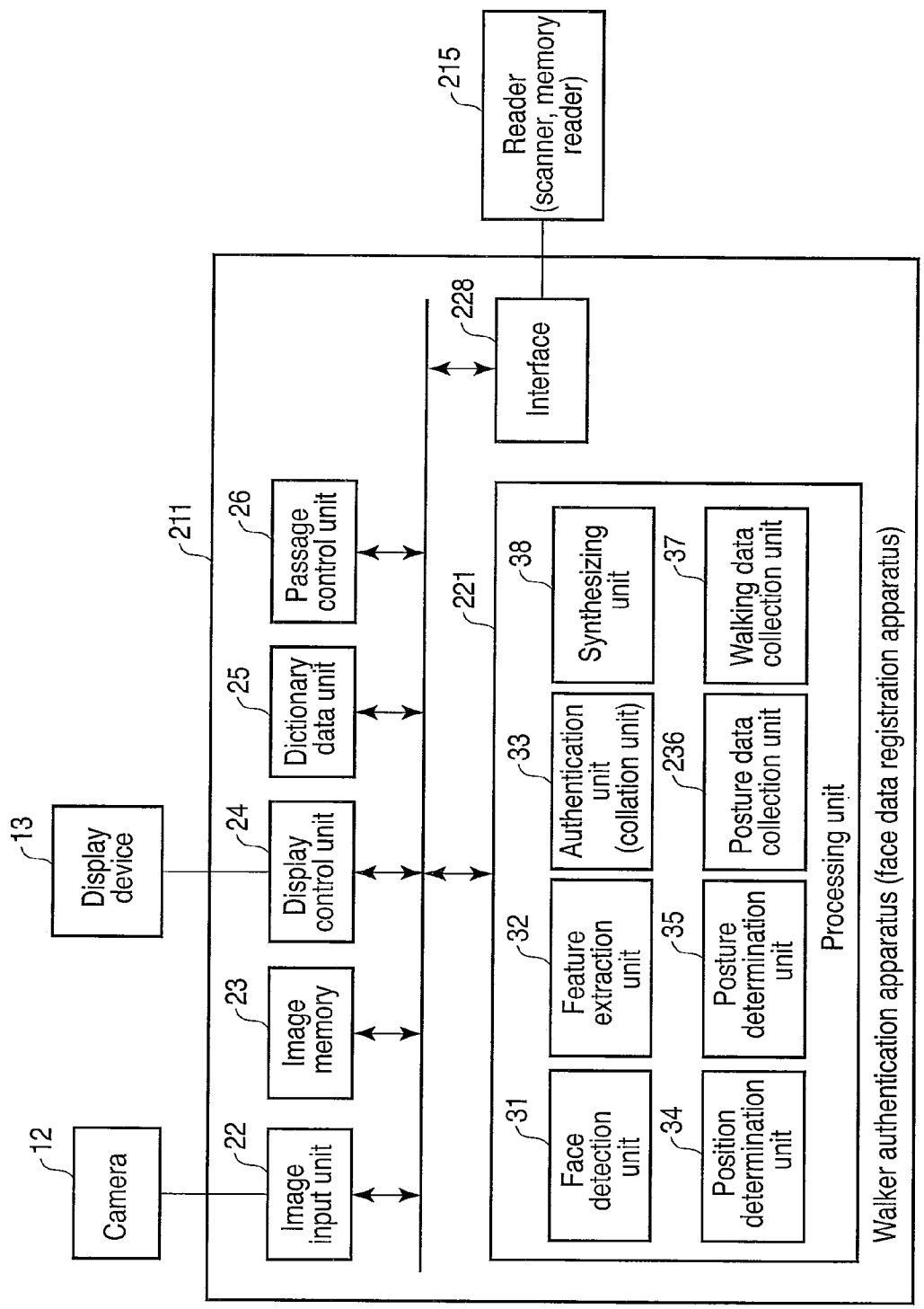
FIG. 16 is a diagram showing an example of the configuration of a walker authentication system according to a third embodiment.

FIG. 16 is a diagram showing an example of the configuration of a walker authentication system according to the third embodiment.

In the walker authentication system shown in FIG. 16, a configuration is designed in which a reader 215 is connected to a walker authentication apparatus 211. The reader 215 is a scanner, memory reader or the like that reads image data of an image containing a face from a storage medium (for example, a print on which a face image is photographed such as a photograph or a storage medium having face image data stored in a memory). In an example of the configuration of the walker authentication apparatus 211 shown in FIG. 16, an interface 228 used to input image data from the reader 215 is provided in addition to the example of the configuration of the walker authentication apparatus 211 according to the first embodiment shown in FIG. 14. In the walker authentication apparatus 211 shown in FIG. 16, the same constituents as the configuration of the walker authentication apparatus 211 shown in FIG. 4 are denoted by the same symbols and the detailed explanation is omitted.

The interface 228 is used to input image data from the reader 215. For example, when the reader 215 is a scanner, the interface 228 inputs image (face image) data obtained by optically reading an image from a print such as a photograph on which an image containing a face is printed and converting the same into an electrical signal by the scanner. Further, when the reader 215 is a memory reader, the interface 228 inputs image (face image) data read from a memory as a storage medium in which data of an image containing a face is stored by use of the memory reader.

In the walker authentication apparatus 211 according to the third embodiment, a face image used to create posture variation data is acquired from a photograph or storage medium. Therefore, in the walker authentication apparatus 211 of the third embodiment, it is supposed that all of the face images in various desired postures cannot be collected. Even in such a case, posture variation data is collected from a face image of each image input from the interface 228 in a posture data collection unit 236 shown in FIG. 16. For example, even when only face images of two types of postures can be obtained, the posture data collection unit 236 creates posture variation data from the face images. Further, for example, it is possible to tentatively create face images of various postures based on face images obtained from the interface 228 and collect or create posture variation data from the above face images by use of a computer graphics technology. That is, in the posture data collection unit 236, posture variation data is created only from images obtained via the interface 228.

Further, as is explained in the first embodiment, the walking data collection unit 37 collects walking data based on images obtained by photographing a person who actually walks along the passage. However, the third embodiment is not a system that collects face images of a person who walks along the passage according to guidance displayed on the display device 13 as a registration process (that is, the third embodiment is a system that collects walking data without causing the person (registrant) to pay any attention). Therefore, the walker authentication apparatus 211 specifies a person without causing the person to pay any attention and collects walking data of the specified person.

For example, a person who is walking is specified by collating feature amounts (feature vectors) obtained from face images obtained by photographing the person who is walking by the camera 12 with posture variation data (distribution of feature vectors) created based on face images previously collected from the memory or photograph. Further, it is possible to permit a manager who monitors images photographed by the camera 12 to specify a person and input information indicating the specified person by use of an operation unit that is not shown in the drawing.

Next, a registration process in the walker authentication system of the third embodiment is explained.

Figure 18:
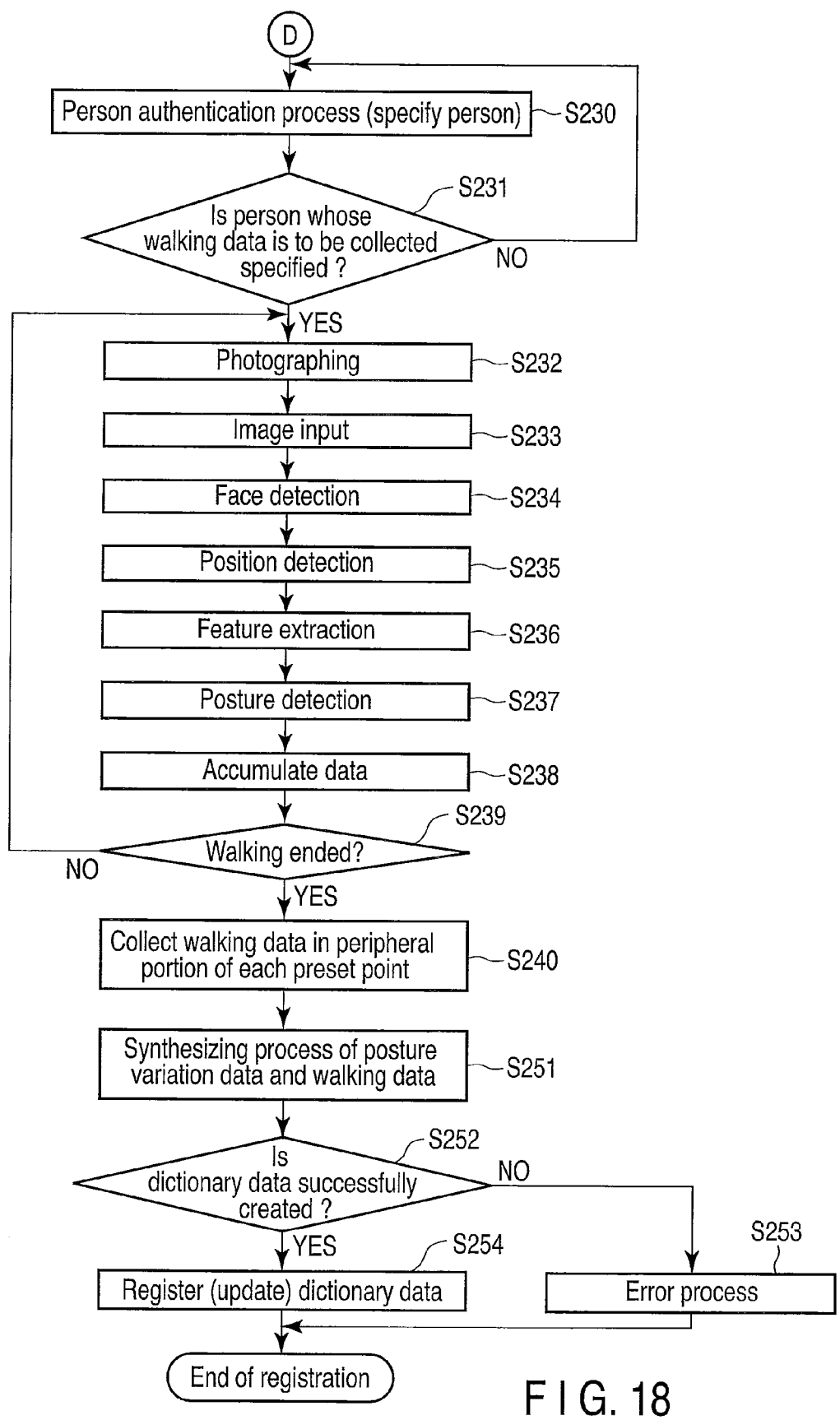
FIG. 18 is a flowchart for illustrating a walking data collection process and synthesizing process in the dictionary data registration process as the third embodiment.

FIG. 17 and FIG. 18 are flowcharts for illustrating an example of the registration process of dictionary data according to the third embodiment.

In FIG. 17 and FIG. 18, a process of steps S211 to S223 that will be described later is a posture variation data collection process as the third embodiment, a process of steps S231 to S240 that will be described later is a walking data collection process as the third embodiment, and a process of steps S51 to S54 that will be described later is a synthesizing process as the third embodiment. In the following explanation, the detailed explanation for portions of the processes in FIG. 17 and FIG. 18 that are equivalent to the processes in FIG. 7 and FIG. 8 is omitted.

First, the manager causes the reader 215 to read a photograph in which a to-be-registered person is photographed or a storage medium in which face image data of a to-be-registered person is stored (step S211). Image data items of images containing the face read by the reader 215 are fetched into the walker authentication apparatus 211 via the interface 228 (step S213). The image data items are stored in the image memory 23 or the like. When the image data items are input via the interface 228, input images are sequentially subjected to processes that will be described later in the processing unit 21 of the walker authentication apparatus 211.

That is, when the image data items are input via the interface 228, the face detection unit 31 performs a process of detecting a face image (face region) from the input image data items (step S214). When the face image is extracted, the feature extraction unit 32 performs a process of extracting face feature points and face feature amounts based on the feature points from the face images detected by the face detection unit 31 (step S217). When the face feature points are extracted by the feature extraction unit 32, the posture determination unit 35 performs a process of determining the posture (face direction) based on the relative positional relation between the extracted face feature points (step S218).

Further, if the posture is determined by the posture determination unit 35, the posture data collection unit 236 collects face feature amounts extracted by the feature extraction unit 32 as feature amounts of a face in the posture (step S220). If the feature amounts of the face in the posture are collected, the processing unit 221 determines whether next face image data used to collect posture variation data is present or not (step S221). For example, the processing unit 221 determines whether next face image data used to collect posture variation data is present or not depending on whether or not the data is image data that is not read by the reader 215 or whether collection of the face feature amounts for all of the image data items input via the interface 228 is completed or not.

If it is determined by the above determination that next face image data used to collect posture variation data is present (NO in step S221), the processing unit 221 repeatedly performs a process starting from step S211 or step S213.

Further, if it is determined by the above determination that next face image data used to collect posture variation data is not present (NO in step S221), the posture data collection unit 236 creates posture variation data based on face feature amounts collected in step S220 (feature amounts obtained from each image data input by the interface 228) (step S222). If position variation data items at plural points in the passage are required, the posture data collection unit 236 may create posture variation data at each point in the passage by use of the method explained in the modification of the first embodiment.

If the posture variation data of the person is created, the processing unit 221 temporarily registers the created posture variation data as dictionary data of the person into the dictionary data unit 25 (step S223). As a result, in the walker authentication apparatus 211, a state in which an authentication process (face collation process) of a person can be performed by using the posture variation data as dictionary data is set. In this case, the reason why the posture variation data is temporarily registered as dictionary data is to extract (specify) a person whose walking data is to be collected by face collation.

That is, in a state in which the posture variation data is registered as dictionary data in the dictionary data unit 25 by the above process, the walker authentication apparatus 211 performs an authentication process of a person by collating (face collating) feature amounts obtained from images photographed by the camera 12 with the dictionary data (step S230). If a person whose walking data is not required to be collected is specified by the authentication process, that is, if a person of dictionary data in which walking data is already synthesized is specified (NO in step S231), the processing unit 221 returns the process to step S230 and repeatedly performs the authentication process.

Further, if a person whose posture variation data is registered as dictionary data, that is, a person of dictionary data in which walking data is not synthesized is specified by the authentication process (YES in step S231), the processing unit 221 performs a walking data collection process of the person (steps S232 to S240). The process of steps S232 to S240 is the same as the process of steps S32 to S40 explained in the first embodiment. Therefore, the detailed explanation for the process of steps S232 to S240 is omitted.

When the walking data collection process is completed, the processing unit 221 performs a synthesizing and registration (updating) process of the posture variation data and walking data (step S251 to S254). In this case, the process of steps S251 to S254 is the same as the process of steps S51 to S54 explained in the first embodiment. Therefore, the detailed explanation for the process of steps S251 to S254 is omitted.

In the walker authentication apparatus of the third embodiment, plural image data items of the images containing the face of the person are read from a photograph or storage medium, feature amounts are extracted from the read image data items, posture variation data of the person is created based on the feature amounts, further, dictionary data obtained by synthesizing the created posture variation data and walking data is created and the created dictionary data is registered. As a result, according to the walker authentication apparatus of the third embodiment, the dictionary data of the registrant can be created and registered without causing the registrant to pay any attention to the dictionary data registration process.

As a modification of the third embodiment, posture variation data may be collected in the following forms. For example, when a face image of a certain person is recorded in a plurality of different storage media, the walker authentication apparatus 211 may sequentially fetch face images of the person from the storage media and collect posture variation data. Further, when face images of a plurality of persons are recorded in one storage medium, a face collation process may be performed for the face images, face images for the respective persons may be extracted and posture variation data items for the respective persons may be collected based on the face images.

According to one aspect of this invention, a dictionary data registration apparatus and dictionary data registration method capable of efficiently registering dictionary data without imposing an excessive load on the user can be provided.

What is claimed is:

1. A dictionary data registration apparatus, comprising:
a first image input unit that inputs a plurality of images obtained by photographing a face of a registrant in various postures;
a first face detection unit that detects a plurality of face images from the plurality of images inputted by the first image input unit;
a first data collection unit that collects a plurality of face data items based on the plurality of face images detected by the first face detection unit;
a second image input unit that inputs a plurality of images obtained by photographing the face of the registrant while walking;
a second face detection unit that detects a plurality of face images from the plurality of images inputted by the second image input unit;
a second data collection unit that collects a plurality of face data items based on the plurality of face images detected by the second face detection unit;
a synthesizing unit that synthesizes the face data items collected by the first data collection unit and the face data items collected by the second data collection unit; and
a storage unit that stores the synthesized face data items as dictionary data of the registrant.

2. The dictionary data registration apparatus according to claim 1, further comprising a posture determination unit that determines a posture in the face image detected by the first face detection unit and wherein the first data collection unit collects face data obtained from the face image that is determined to be a desired posture by the posture determination unit.

3. The dictionary data registration apparatus according to claim 1, wherein the first data collection unit collects a plurality of face data items obtained from a plurality of face images in a plurality of images obtained by photographing the face of the registrant in various postures who exists at a preset point, and the second data collection unit collects a plurality of face data items obtained from a plurality of face images in a plurality of images obtained by photographing the registrant who is walking in a peripheral portion of the preset point.

4. The dictionary data registration apparatus according to claim 3, further comprising a position determination unit that determines a position of the registrant and wherein the second data collection unit collects face data obtained from a plurality of images obtained by photographing the face of the registrant who is determined to be walking in the peripheral portion of the preset point by the position determination unit.

5. The dictionary data registration apparatus according to claim 1, further comprising a display unit that displays guidance that urges the registrant to change the posture.

6. The dictionary data registration apparatus according to claim 1, wherein the first and second image input units sequentially inputs images from a camera that successively photographs images in the passage along which a to-be-authenticated person walks.

7. The dictionary data registration apparatus according to claim 1, wherein the first and second image input units inputs image data from a recording medium in which images containing a face of a registrant are recorded.

8. A dictionary data registration apparatus, comprising:
a first image input unit that inputs a plurality of images obtained by photographing a face of a registrant in various postures;
a first face detection unit that detects a plurality of face images from the plurality of images inputted by the first image input unit;
a first data collection unit that collects a plurality of face data items based on the plurality of face images detected by the first face detection unit;
a second image input unit that inputs a plurality of images obtained by photographing the face of the registrant while an illumination condition is varied;
a second face detection unit that detects a plurality of face images from the plurality of images inputted by the second image input unit;
a second data collection unit that collects a plurality of face data items based on the plurality of face images detected by the second face detection unit;
a synthesizing unit that synthesizes the face data items collected by the first data collection unit and the face data items collected by the second data collection unit; and
a storage unit that stores the synthesized face data items as dictionary data of the registrant.

9. A dictionary data registration method, comprising:
inputting, via a first input unit, a plurality of images obtained by photographing a face of a registrant in various postures;

detecting, via a first detection unit, a plurality of face images from the plurality of images inputted by the first input unit;

collecting, via a first collection unit, a plurality of face data items based on the plurality of face images detected by the first detection unit;

inputting, via a second input unit, a plurality of images obtained by photographing the face of the registrant while walking;

detecting, via a second detection unit, a plurality of face images from the plurality of images inputted by the second input unit;

collecting, via a second collection unit, a plurality of face data items based on the plurality of face images detected by the second detection unit;

synthesizing the face data items collected by the first collection unit and the face data items collected by the second collection unit; and storing the synthesized face data items as dictionary data of the registrant into a storage unit.

10. A dictionary data registration method, comprising:

inputting, via a first input unit, a plurality of images obtained by photographing a face of a registrant in various postures;

detecting, via a first detection unit, a plurality of face images from the plurality of images inputted by the first input unit;

collecting, via a first collection unit, a plurality of face data items based on the plurality of face images detected by the first detection unit;

inputting, via a second input unit, a plurality of images obtained by photographing the face of the registrant while varying an illumination condition;

detecting, via a second detection unit, a plurality of face images from the plurality of images inputted by the second input unit;

collecting, via a second collection unit, a plurality of face data items based on the plurality of face images detected by the second detection unit;

synthesizing the face data items collected by the first collection unit and the face data items collected by the second collection unit; and storing the synthesized face data items as dictionary data of the registrant into a storage unit.

* * * * *